(12) United States Patent
Botvinnik et al.

(10) Patent No.: US 7,517,503 B2
(45) Date of Patent: Apr. 14, 2009

(54) ELECTRO-KINETIC AIR TRANSPORTER AND CONDITIONER DEVICES INCLUDING PIN-RING ELECTRODE CONFIGURATIONS WITH DRIVER ELECTRODE

(75) Inventors: Igor Y. Botvinnik, Novato, CA (US); Andrew J. Parker, Novato, CA (US); Charles E. Taylor, Punta Gorda, FL (US)

(73) Assignee: Sharper Image Acquisition LLC, New York, NY (US)

( * ) Notice: Subject to any disclaimer, the term of this patent is extended or adjusted under 35 U.S.C. 154(b) by 925 days.

(21) Appl. No.: 10/791,561

(22) Filed: Mar. 2, 2004

(65) Prior Publication Data

US 2005/0194246 A1 Sep. 8, 2005

(51) Int. Cl.
*B01J 19/08* (2006.01)
(52) U.S. Cl. ............................. 422/186.04; 422/186.3; 422/121; 96/96
(58) Field of Classification Search ............ 422/186.04, 422/186.03, 121; 96/96
See application file for complete search history.

(56) References Cited

U.S. PATENT DOCUMENTS

| 653,421 | A | 7/1900 | Lorey |
| 895,729 | A | 8/1908 | Carlborg |
| 995,958 | A | 6/1911 | Goldberg |
| 1,791,338 | A | 2/1931 | Wintermute |
| 1,869,335 | A | 7/1932 | Day |
| 1,882,949 | A | 10/1932 | Ruder |
| 2,129,783 | A | 9/1938 | Penney |
| 2,327,588 | A | 8/1943 | Bennett |
| 2,359,057 | A | 9/1944 | Skinner |
| 2,509,548 | A | 5/1950 | White |
| 2,590,447 | A | 3/1952 | Nord et al. |
| 2,949,550 | A | 8/1960 | Brown |
| 3,018,394 | A | 1/1962 | Brown |
| 3,026,964 | A | 3/1962 | Penney |
| 3,374,941 | A | 3/1968 | Okress |

(Continued)

FOREIGN PATENT DOCUMENTS

CN 2111112 U 7/1972

(Continued)

OTHER PUBLICATIONS

U.S. Appl. No. 10/278,193, filed Oct. 21, 2002, Reeves et al.

(Continued)

*Primary Examiner*—Kishor Mayekar

(57) ABSTRACT

Electro-kinetic air transporter and conditioner systems and methods are provided. A system includes a pin emitter electrode and a ring collector electrode located downstream from the emitter electrode. A driver electrode, which is preferably insulated, is located at least partially within an interior of said ring collector electrode. A high voltage source provides a voltage potential to at least one of said emitter electrode and said collector electrode to thereby provide a potential difference therebetween. The driver electrode may or may not be at a same voltage potential as the emitter electrode, but should be at a different voltage potential than the collector electrode. This description is not intended to be a complete description of, or limit the scope of, the invention. Other features, aspects, and objects of the invention can be obtained from a review of the specification, the figures, and the claims.

42 Claims, 14 Drawing Sheets

U.S. PATENT DOCUMENTS

| | | |
|---|---|---|
| 3,518,462 A | 6/1970 | Brown |
| 3,540,191 A | 11/1970 | Herman |
| 3,581,470 A | 6/1971 | Aitkenhead et al. |
| 3,638,058 A | 1/1972 | Fritzius |
| 3,744,216 A | 7/1973 | Halloran |
| 3,806,763 A | 4/1974 | Masuda |
| 3,892,927 A | 7/1975 | Lindengerg |
| 3,945,813 A | 3/1976 | Iinoya et al. |
| 3,958,960 A | 5/1976 | Bakke |
| 3,958,961 A | 5/1976 | Bakke |
| 3,958,962 A | 5/1976 | Hayashi |
| 3,981,695 A | 9/1976 | Fuchs |
| 3,984,215 A | 10/1976 | Zucker |
| 3,988,131 A | 10/1976 | Kanazawa et al. |
| 4,007,024 A | 2/1977 | Sallee et al. |
| 4,052,177 A | 10/1977 | Kide |
| 4,056,372 A | 11/1977 | Hayashi |
| 4,070,163 A | 1/1978 | Kolb et al. |
| 4,074,983 A | 2/1978 | Bakke |
| 4,092,134 A | 5/1978 | Kikuchi |
| 4,097,252 A | 6/1978 | Kirchhoff et al. |
| 4,102,654 A | 7/1978 | Pellin |
| 4,104,042 A | 8/1978 | Brozenick |
| 4,110,086 A | 8/1978 | Schwab et al. |
| 4,119,415 A | 10/1978 | Hayashi et al. |
| 4,126,434 A | 11/1978 | Keiichi |
| 4,138,233 A | 2/1979 | Masuda |
| 4,147,522 A | 4/1979 | Gonas et al. |
| 4,155,792 A | 5/1979 | Gelhaar et al. |
| 4,171,975 A | 10/1979 | Kato et al. |
| 4,185,971 A | 1/1980 | Isahaya |
| 4,189,308 A | 2/1980 | Feldman |
| 4,205,969 A | 6/1980 | Matsumoto |
| 4,209,306 A | 6/1980 | Feldman et al. |
| 4,218,225 A | 8/1980 | Kirchhoff et al. |
| 4,225,323 A | 9/1980 | Zarchy et al. |
| 4,227,894 A | 10/1980 | Proynoff |
| 4,231,766 A | 11/1980 | Spurgin |
| 4,232,355 A | 11/1980 | Finger et al. |
| 4,244,710 A | 1/1981 | Burger |
| 4,244,712 A | 1/1981 | Tongret |
| 4,251,234 A | 2/1981 | Chang |
| 4,253,852 A | 3/1981 | Adams |
| 4,259,093 A | 3/1981 | Vlastos et al. |
| 4,259,452 A | 3/1981 | Yukuta et al. |
| 4,259,707 A | 3/1981 | Penney |
| 4,264,343 A * | 4/1981 | Natarajan et al. .............. 96/48 |
| 4,266,948 A | 5/1981 | Teague et al. |
| 4,282,014 A | 8/1981 | Winkler et al. |
| 4,284,420 A | 8/1981 | Borysiak |
| 4,289,504 A | 9/1981 | Scholes |
| 4,293,319 A | 10/1981 | Claassen, Jr. |
| 4,308,036 A | 12/1981 | Zahedi et al. |
| 4,315,188 A | 2/1982 | Cerny et al. |
| 4,318,718 A | 3/1982 | Utsumi et al. |
| 4,338,560 A | 7/1982 | Lemley |
| 4,342,571 A | 8/1982 | Hayashi |
| 4,349,359 A | 9/1982 | Fitch et al. |
| 4,351,648 A | 9/1982 | Penney |
| 4,354,861 A | 10/1982 | Kalt |
| 4,357,150 A | 11/1982 | Masuda et al. |
| 4,362,632 A | 12/1982 | Jacob |
| 4,363,072 A | 12/1982 | Coggins |
| 4,366,525 A | 12/1982 | Baumgartner |
| 4,369,776 A | 1/1983 | Roberts |
| 4,375,364 A | 3/1983 | Van Hoesen et al. |
| 4,380,900 A | 4/1983 | Linder et al. |
| 4,386,395 A | 5/1983 | Francis, Jr. |
| 4,391,614 A | 7/1983 | Rozmus |
| 4,394,239 A | 7/1983 | Kitzelmann et al. |
| 4,405,342 A | 9/1983 | Bergman |
| 4,406,671 A | 9/1983 | Rozmus |
| 4,412,850 A | 11/1983 | Kurata et al. |
| 4,413,225 A | 11/1983 | Donig et al. |
| 4,414,603 A | 11/1983 | Masuda |
| 4,435,190 A | 3/1984 | Taillet et al. |
| 4,440,552 A | 4/1984 | Uchiya et al. |
| 4,443,234 A | 4/1984 | Carlsson |
| 4,445,911 A | 5/1984 | Lind |
| 4,477,263 A | 10/1984 | Shaver et al. |
| 4,477,268 A | 10/1984 | Kalt |
| 4,481,017 A | 11/1984 | Furlong |
| 4,496,375 A | 1/1985 | Le Vantine |
| 4,502,002 A | 2/1985 | Ando |
| 4,505,724 A | 3/1985 | Baab |
| 4,509,958 A | 4/1985 | Masuda et al. |
| 4,514,780 A | 4/1985 | Brussee et al. |
| 4,515,982 A | 5/1985 | Lechtken et al. |
| 4,516,991 A | 5/1985 | Kawashima |
| 4,521,229 A | 6/1985 | Baker et al. |
| 4,522,634 A | 6/1985 | Frank |
| 4,534,776 A | 8/1985 | Mammel et al. |
| 4,536,698 A | 8/1985 | Shevalenko et al. |
| 4,544,382 A | 10/1985 | Taillet et al. |
| 4,555,252 A | 11/1985 | Eckstein |
| 4,569,684 A | 2/1986 | Ibbott |
| 4,582,961 A | 4/1986 | Frederiksen |
| 4,587,475 A | 5/1986 | Finney, Jr. et al. |
| 4,588,423 A | 5/1986 | Gillingham et al. |
| 4,590,042 A | 5/1986 | Drage |
| 4,597,780 A | 7/1986 | Reif |
| 4,597,781 A | 7/1986 | Spector |
| 4,600,411 A | 7/1986 | Santamaria |
| 4,601,733 A | 7/1986 | Ordines et al. |
| 4,604,174 A | 8/1986 | Bollinger et al. |
| 4,614,573 A | 9/1986 | Masuda |
| 4,623,365 A | 11/1986 | Bergman |
| 4,626,261 A | 12/1986 | Jorgensen |
| 4,632,135 A | 12/1986 | Lenting et al. |
| 4,632,746 A | 12/1986 | Bergman |
| 4,636,981 A | 1/1987 | Ogura |
| 4,643,744 A | 2/1987 | Brooks |
| 4,643,745 A | 2/1987 | Sakakibara et al. |
| 4,647,836 A | 3/1987 | Olsen |
| 4,650,648 A | 3/1987 | Beer et al. |
| 4,656,010 A | 4/1987 | Leitzke et al. |
| 4,657,738 A | 4/1987 | Kanter et al. |
| 4,659,342 A | 4/1987 | Lind |
| 4,662,903 A | 5/1987 | Yanagawa |
| 4,666,474 A | 5/1987 | Cook |
| 4,668,479 A | 5/1987 | Manabe et al. |
| 4,670,026 A | 6/1987 | Hoenig |
| 4,674,003 A | 6/1987 | Zylka |
| 4,680,496 A | 7/1987 | Letournel et al. |
| 4,686,370 A | 8/1987 | Blach |
| 4,689,056 A | 8/1987 | Noguchi et al. |
| 4,691,829 A | 9/1987 | Auer |
| 4,692,174 A | 9/1987 | Gelfand et al. |
| 4,693,869 A | 9/1987 | Pfaff |
| 4,694,376 A | 9/1987 | Gesslauer |
| 4,702,752 A | 10/1987 | Yanagawa |
| 4,713,092 A | 12/1987 | Kikuchi et al. |
| 4,713,093 A | 12/1987 | Hansson |
| 4,713,724 A | 12/1987 | Voelkel |
| 4,715,870 A | 12/1987 | Masuda et al. |
| 4,725,289 A | 2/1988 | Quintilian |
| 4,726,812 A | 2/1988 | Hirth |
| 4,726,814 A | 2/1988 | Weitman |
| 4,736,127 A | 4/1988 | Jacobsen |
| 4,743,275 A | 5/1988 | Flanagan |
| 4,749,390 A | 6/1988 | Burnett et al. |
| 4,750,921 A | 6/1988 | Sugita et al. |
| 4,760,302 A | 7/1988 | Jacobsen |
| 4,760,303 A | 7/1988 | Miyake |

| Patent No. | Date | Inventor |
|---|---|---|
| 4,765,802 A | 8/1988 | Gombos et al. |
| 4,771,361 A | 9/1988 | Varga |
| 4,772,297 A | 9/1988 | Anzai |
| 4,779,182 A | 10/1988 | Mickal et al. |
| 4,781,736 A | 11/1988 | Cheney et al. |
| 4,786,844 A | 11/1988 | Farrell et al. |
| 4,789,801 A * | 12/1988 | Lee .................. 310/308 |
| 4,808,200 A | 2/1989 | Dallhammer et al. |
| 4,811,159 A | 3/1989 | Foster, Jr. |
| 4,822,381 A | 4/1989 | Mosley et al. |
| 4,853,005 A | 8/1989 | Jaisinghani et al. |
| 4,869,736 A | 9/1989 | Ivester et al. |
| 4,892,713 A | 1/1990 | Newman |
| 4,929,139 A | 5/1990 | Vorreiter et al. |
| 4,940,470 A | 7/1990 | Jaisinghani et al. |
| 4,940,894 A | 7/1990 | Morters |
| 4,941,068 A | 7/1990 | Hofmann |
| 4,941,224 A | 7/1990 | Saeki et al. |
| 4,944,778 A | 7/1990 | Yanagawa |
| 4,954,320 A | 9/1990 | Birmingham et al. |
| 4,955,991 A | 9/1990 | Torok et al. |
| 4,966,666 A | 10/1990 | Waltonen |
| 4,967,119 A | 10/1990 | Torok et al. |
| 4,976,752 A | 12/1990 | Torok et al. |
| 4,978,372 A | 12/1990 | Pick |
| D315,598 S | 3/1991 | Yamamoto et al. |
| 5,003,774 A | 4/1991 | Leonard |
| 5,006,761 A | 4/1991 | Torok et al. |
| 5,010,869 A | 4/1991 | Lee |
| 5,012,093 A | 4/1991 | Shimizu |
| 5,012,094 A | 4/1991 | Hamade |
| 5,012,159 A | 4/1991 | Torok et al. |
| 5,022,979 A | 6/1991 | Hijikata et al. |
| 5,024,685 A | 6/1991 | Torok et al. |
| 5,030,254 A | 7/1991 | Heyen et al. |
| 5,034,033 A | 7/1991 | Alsup et al. |
| 5,037,456 A | 8/1991 | Yu |
| 5,045,095 A | 9/1991 | You |
| 5,053,912 A | 10/1991 | Loreth et al. |
| 5,059,219 A | 10/1991 | Plaks et al. |
| 5,061,462 A | 10/1991 | Suzuki |
| 5,066,313 A | 11/1991 | Mallory, Sr. |
| 5,072,746 A | 12/1991 | Kantor |
| 5,076,820 A | 12/1991 | Gurvitz |
| 5,077,468 A | 12/1991 | Hamade |
| 5,077,500 A | 12/1991 | Torok et al. |
| 5,100,440 A | 3/1992 | Stahel et al. |
| RE33,927 E | 5/1992 | Fuzimura |
| D326,514 S | 5/1992 | Alsup et al. |
| 5,118,942 A | 6/1992 | Hamade |
| 5,125,936 A | 6/1992 | Johansson |
| 5,136,461 A | 8/1992 | Zellweger |
| 5,137,546 A | 8/1992 | Steinbacher et al. |
| 5,141,529 A | 8/1992 | Oakley et al. |
| 5,141,715 A | 8/1992 | Sackinger et al. |
| D329,284 S | 9/1992 | Patton |
| 5,147,429 A | 9/1992 | Bartholomew et al. |
| 5,154,733 A | 10/1992 | Fujii et al. |
| 5,158,580 A | 10/1992 | Chang |
| D332,655 S | 1/1993 | Lytle et al. |
| 5,180,404 A | 1/1993 | Loreth et al. |
| 5,183,480 A | 2/1993 | Raterman et al. |
| 5,196,171 A | 3/1993 | Peltier |
| 5,198,003 A | 3/1993 | Haynes |
| 5,199,257 A | 4/1993 | Colletta et al. |
| 5,210,678 A | 5/1993 | Lain et al. |
| 5,215,558 A | 6/1993 | Moon |
| 5,217,504 A | 6/1993 | Johansson |
| 5,217,511 A | 6/1993 | Plaks et al. |
| 5,234,555 A | 8/1993 | Ibbott |
| 5,248,324 A | 9/1993 | Hara |
| 5,250,267 A | 10/1993 | Johnson et al. |
| 5,254,155 A | 10/1993 | Mensi |
| 5,266,004 A | 11/1993 | Tsumurai et al. |
| 5,271,763 A | 12/1993 | Jang |
| 5,282,891 A | 2/1994 | Durham |
| 5,290,343 A | 3/1994 | Morita et al. |
| 5,296,019 A | 3/1994 | Oakley et al. |
| 5,302,190 A | 4/1994 | Williams |
| 5,308,586 A | 5/1994 | Fritsche et al. |
| 5,315,838 A | 5/1994 | Thompson |
| 5,316,741 A | 5/1994 | Sewell et al. |
| 5,330,559 A | 7/1994 | Cheney et al. |
| 5,348,571 A | 9/1994 | Weber |
| 5,376,168 A | 12/1994 | Inculet |
| 5,378,978 A | 1/1995 | Gallo et al. |
| 5,386,839 A | 2/1995 | Chen |
| 5,395,430 A | 3/1995 | Lundgren et al. |
| 5,401,301 A | 3/1995 | Schulmerich et al. |
| 5,401,302 A | 3/1995 | Schulmerich et al. |
| 5,403,383 A | 4/1995 | Jaisinghani |
| 5,405,434 A | 4/1995 | Inculet |
| 5,407,469 A | 4/1995 | Sun |
| 5,407,639 A | 4/1995 | Watanabe et al. |
| 5,417,936 A | 5/1995 | Suzuki et al. |
| 5,419,953 A | 5/1995 | Chapman |
| 5,433,772 A | 7/1995 | Sikora |
| 5,435,817 A | 7/1995 | Davis et al. |
| 5,435,978 A | 7/1995 | Yokomi |
| 5,437,713 A | 8/1995 | Chang |
| 5,437,843 A | 8/1995 | Kuan |
| 5,445,798 A | 8/1995 | Ikeda et al. |
| 5,466,279 A | 11/1995 | Hattori et al. |
| 5,468,454 A | 11/1995 | Kim |
| 5,474,599 A | 12/1995 | Cheney et al. |
| 5,484,472 A | 1/1996 | Weinberg |
| 5,484,473 A | 1/1996 | Bontempi |
| 5,492,678 A | 2/1996 | Ota et al. |
| 5,501,844 A | 3/1996 | Kasting, Jr. et al. |
| 5,503,808 A | 4/1996 | Garbutt et al. |
| 5,503,809 A | 4/1996 | Coate et al. |
| 5,505,914 A | 4/1996 | Tona-Serra |
| 5,508,008 A | 4/1996 | Wasser |
| 5,514,345 A | 5/1996 | Garbutt et al. |
| 5,516,493 A | 5/1996 | Bell et al. |
| 5,518,531 A | 5/1996 | Joannu |
| 5,520,887 A | 5/1996 | Shimizu et al. |
| 5,525,310 A | 6/1996 | Decker et al. |
| 5,529,613 A | 6/1996 | Yavnieli |
| 5,529,760 A | 6/1996 | Burris |
| 5,532,798 A | 7/1996 | Nakagami et al. |
| 5,535,089 A | 7/1996 | Ford et al. |
| 5,536,477 A | 7/1996 | Cha et al. |
| 5,538,695 A | 7/1996 | Shinjo et al. |
| 5,540,761 A | 7/1996 | Yamamoto |
| 5,542,967 A | 8/1996 | Ponizovsky et al. |
| 5,545,379 A | 8/1996 | Gray |
| 5,545,380 A | 8/1996 | Gray |
| 5,547,643 A | 8/1996 | Nomoto et al. |
| 5,549,874 A | 8/1996 | Kamiya et al. |
| 5,554,344 A | 9/1996 | Duarte |
| 5,554,345 A | 9/1996 | Kitchenman |
| 5,569,368 A | 10/1996 | Larsky et al. |
| 5,569,437 A | 10/1996 | Stiehl et al. |
| D375,546 S | 11/1996 | Lee |
| 5,571,483 A | 11/1996 | Pfingstl et al. |
| 5,573,577 A | 11/1996 | Joannou |
| 5,573,730 A | 11/1996 | Gillum |
| 5,578,112 A | 11/1996 | Krause |
| 5,578,280 A | 11/1996 | Kazi et al. |
| 5,582,632 A | 12/1996 | Nohr et al. |
| 5,587,131 A | 12/1996 | Malkin et al. |
| D377,523 S | 1/1997 | Marvin et al. |
| 5,591,253 A | 1/1997 | Altman et al. |
| 5,591,334 A | 1/1997 | Shimizu et al. |
| 5,591,412 A | 1/1997 | Jones et al. |

| | | | | | | |
|---|---|---|---|---|---|---|
| 5,593,476 | A | 1/1997 | Coppom | 6,350,417 | B1 | 2/2002 | Lau et al. |
| 5,601,636 | A | 2/1997 | Glucksman | 6,362,604 | B1 | 3/2002 | Cravey |
| 5,603,752 | A | 2/1997 | Hara | 6,372,097 | B1 | 4/2002 | Chen |
| 5,603,893 | A | 2/1997 | Gundersen et al. | 6,373,723 | B1 | 4/2002 | Wallgren et al. |
| 5,614,002 | A | 3/1997 | Chen | 6,379,427 | B1 | 4/2002 | Siess |
| 5,624,476 | A | 4/1997 | Eyraud | 6,391,259 | B1 | 5/2002 | Malkin et al. |
| 5,630,866 | A | 5/1997 | Gregg | 6,398,852 | B1 | 6/2002 | Loreth |
| 5,630,990 | A | 5/1997 | Conrad et al. | 6,447,587 | B1 | 9/2002 | Pillion et al. |
| 5,637,198 | A | 6/1997 | Breault | 6,451,266 | B1 | 9/2002 | Lau et al. |
| 5,637,279 | A | 6/1997 | Besen et al. | 6,464,754 | B1 | 10/2002 | Ford |
| 5,641,342 | A | 6/1997 | Smith et al. | 6,471,753 | B1 | 10/2002 | Ahn et al. |
| 5,641,461 | A | 6/1997 | Ferone | 6,494,940 | B1 | 12/2002 | Hak |
| 5,647,890 | A | 7/1997 | Yamamoto | 6,504,308 | B1 | 1/2003 | Krichtafovitch et al. |
| 5,648,049 | A | 7/1997 | Jones et al. | 6,508,982 | B1 | 1/2003 | Shoji |
| 5,655,210 | A | 8/1997 | Gregoire et al. | 6,544,485 | B1 | 4/2003 | Taylor |
| 5,656,063 | A | 8/1997 | Hsu | 6,585,935 | B1 | 7/2003 | Taylor et al. |
| 5,665,147 | A | 9/1997 | Taylor et al. | 6,588,434 | B2 | 7/2003 | Taylor et al. |
| 5,667,563 | A | 9/1997 | Silva, Jr. | 6,603,268 | B2 | 8/2003 | Lee |
| 5,667,564 | A | 9/1997 | Weinberg | 6,613,277 | B1 | 9/2003 | Monagan |
| 5,667,565 | A | 9/1997 | Gondar | 6,632,407 | B1 | 10/2003 | Lau et al. |
| 5,667,756 | A | 9/1997 | Ho | 6,635,105 | B2 | 10/2003 | Ahlborn et al. |
| 5,669,963 | A | 9/1997 | Horton et al. | 6,672,315 | B2 | 1/2004 | Taylor et al. |
| 5,678,237 | A | 10/1997 | Powell et al. | 6,709,484 | B2 | 3/2004 | Lau et al. |
| 5,681,434 | A | 10/1997 | Eastlund | 6,713,026 | B2 | 3/2004 | Taylor et al. |
| 5,681,533 | A | 10/1997 | Hiromi | 6,735,830 | B1 | 5/2004 | Merciel |
| 5,698,164 | A | 12/1997 | Kishioka et al. | 6,749,667 | B2 | 6/2004 | Reeves et al. |
| 5,702,507 | A | 12/1997 | Wang | 6,753,652 | B2 | 6/2004 | Kim |
| D389,567 | S | 1/1998 | Gudefin | 6,761,796 | B2 | 7/2004 | Srivastava et al. |
| 5,766,318 | A | 6/1998 | Loreth et al. | 6,768,108 | B2 | 7/2004 | Hirano et al. |
| 5,779,769 | A | 7/1998 | Jiang | 6,768,110 | B2 | 7/2004 | Alani |
| 5,814,135 | A | 9/1998 | Weinberg | 6,768,120 | B2 | 7/2004 | Leung et al. |
| 5,879,435 | A * | 3/1999 | Satyapal et al. ............... 96/16 | 6,768,121 | B2 | 7/2004 | Horskey |
| 5,893,977 | A | 4/1999 | Pucci | 6,770,878 | B2 | 8/2004 | Uhlemann et al. |
| 5,911,957 | A | 6/1999 | Khatchatrian et al. | 6,774,359 | B1 | 8/2004 | Hirabayashi et al. |
| 5,972,076 | A | 10/1999 | Nichols et al. | 6,777,686 | B2 | 8/2004 | Olson et al. |
| 5,975,090 | A | 11/1999 | Taylor et al. | 6,777,699 | B1 | 8/2004 | Miley et al. |
| 5,980,614 | A | 11/1999 | Loreth et al. | 6,777,882 | B2 | 8/2004 | Goldberg et al. |
| 5,993,521 | A | 11/1999 | Loreth et al. | 6,781,136 | B1 | 8/2004 | Kato |
| 5,997,619 | A | 12/1999 | Knuth et al. | 6,785,912 | B1 | 9/2004 | Julio |
| 6,019,815 | A | 2/2000 | Satyapal et al. | 6,791,814 | B2 | 9/2004 | Adachi et al. |
| 6,042,637 | A * | 3/2000 | Weinberg ..................... 96/58 | 6,794,661 | B2 | 9/2004 | Tsukihara et al. |
| 6,056,808 | A * | 5/2000 | Krause .......................... 96/24 | 6,797,339 | B2 | 9/2004 | Akizuki et al. |
| 6,063,168 | A | 5/2000 | Nichols et al. | 6,797,964 | B2 | 9/2004 | Yamashita |
| 6,086,657 | A | 7/2000 | Freije | 6,799,068 | B2 | 9/2004 | Hartmann et al. |
| 6,117,216 | A | 9/2000 | Loreth | 6,800,862 | B2 | 10/2004 | Matsumoto et al. |
| 6,118,645 | A | 9/2000 | Partridge | 6,803,585 | B2 | 10/2004 | Glukhoy |
| 6,126,722 | A | 10/2000 | Mitchell et al. | 6,805,916 | B2 | 10/2004 | Cadieu |
| 6,126,727 | A | 10/2000 | Lo | 6,806,035 | B1 | 10/2004 | Atireklapvarodom et al. |
| 6,149,717 | A | 11/2000 | Satyapal et al. | 6,806,163 | B2 | 10/2004 | Wu et al. |
| 6,149,815 | A | 11/2000 | Sauter | 6,806,468 | B2 | 10/2004 | Laiko et al. |
| 6,152,146 | A | 11/2000 | Taylor et al. | 6,808,606 | B2 | 10/2004 | Thomsen et al. |
| 6,163,098 | A | 12/2000 | Taylor et al. | 6,809,310 | B2 | 10/2004 | Chen |
| 6,176,977 | B1 | 1/2001 | Taylor et al. | 6,809,312 | B1 | 10/2004 | Park et al. |
| 6,182,461 | B1 | 2/2001 | Washburn et al. | 6,809,325 | B2 | 10/2004 | Dahl et al. |
| 6,182,671 | B1 | 2/2001 | Taylor et al. | 6,812,647 | B2 | 11/2004 | Cornelius |
| 6,187,536 | B1 | 2/2001 | Weinberg | 6,815,690 | B2 | 11/2004 | Veerasamy et al. |
| 6,193,852 | B1 | 2/2001 | Caracciolo et al. | 6,818,257 | B2 | 11/2004 | Amann et al. |
| 6,203,600 | B1 | 3/2001 | Loreth | 6,818,909 | B2 | 11/2004 | Murrell et al. |
| 6,212,883 | B1 | 4/2001 | Kang | 6,819,053 | B2 | 11/2004 | Johnson |
| 6,228,149 | B1 | 5/2001 | Alenichev et al. | 6,863,869 | B2 | 3/2005 | Taylor et al. |
| 6,252,012 | B1 | 6/2001 | Egitto et al. | 6,896,853 | B2 | 5/2005 | Law et al. |
| 6,270,733 | B1 | 8/2001 | Rodden | 6,911,186 | B2 | 6/2005 | Taylor et al. |
| 6,277,248 | B1 | 8/2001 | Ishioka et al. | 2001/0004046 | A1 | 6/2001 | Taylor et al. |
| 6,282,106 | B2 | 8/2001 | Grass | 2001/0048906 | A1 | 12/2001 | Lau et al. |
| D449,097 | S | 10/2001 | Smith et al. | 2002/0069760 | A1 | 6/2002 | Pruette et al. |
| D449,679 | S | 10/2001 | Smith et al. | 2002/0079212 | A1 | 6/2002 | Taylor et al. |
| 6,296,692 | B1 | 10/2001 | Gutmann | 2002/0098131 | A1 | 7/2002 | Taylor et al. |
| 6,302,944 | B1 | 10/2001 | Hoenig | 2002/0122751 | A1 | 9/2002 | Sinaiko et al. |
| 6,309,514 | B1 | 10/2001 | Conrad et al. | 2002/0122752 | A1 | 9/2002 | Taylor et al. |
| 6,312,507 | B1 | 11/2001 | Taylor et al. | 2002/0127156 | A1 | 9/2002 | Taylor |
| 6,315,821 | B1 | 11/2001 | Pillion et al. | 2002/0134664 | A1 | 9/2002 | Taylor et al. |
| 6,328,791 | B1 | 12/2001 | Pillion et al. | 2002/0134665 | A1 | 9/2002 | Taylor et al. |
| 6,348,103 | B1 | 2/2002 | Ahlborn et al. | 2002/0141914 | A1 | 10/2002 | Lau et al. |

| | | | |
|---|---|---|---|
| 2002/0144601 A1 | 10/2002 | Palestro et al. | |
| 2002/0146356 A1 | 10/2002 | Sinaiko et al. | |
| 2002/0150520 A1 | 10/2002 | Taylor et al. | |
| 2002/0152890 A1 | 10/2002 | Leiser | |
| 2002/0155041 A1 | 10/2002 | McKinney, Jr. et al. | |
| 2002/0170435 A1 | 11/2002 | Joannou | |
| 2002/0190658 A1 | 12/2002 | Lee | |
| 2002/0195951 A1 | 12/2002 | Lee | |
| 2003/0005824 A1 | 1/2003 | Katou et al. | |
| 2003/0170150 A1 | 9/2003 | Law et al. | |
| 2003/0196887 A1 | 10/2003 | Lau et al. | |
| 2003/0206837 A1 | 11/2003 | Taylor et al. | |
| 2003/0206839 A1 | 11/2003 | Taylor et al. | |
| 2003/0206840 A1 | 11/2003 | Taylor et al. | |
| 2004/0033176 A1 | 2/2004 | Lee et al. | |
| 2004/0052700 A1 | 3/2004 | Kotlyar et al. | |
| 2004/0065202 A1 | 4/2004 | Gatchell et al. | |
| 2004/0096376 A1 | 5/2004 | Taylor | |
| 2004/0136863 A1 | 7/2004 | Yates et al. | |
| 2004/0166037 A1 | 8/2004 | Youdell et al. | |
| 2004/0226447 A1 | 11/2004 | Lau et al. | |
| 2004/0234431 A1 | 11/2004 | Taylor et al. | |
| 2004/0237787 A1 | 12/2004 | Reeves et al. | |
| 2004/0251124 A1 | 12/2004 | Lau | |
| 2004/0251909 A1 | 12/2004 | Taylor et al. | |
| 2005/0000793 A1 | 1/2005 | Taylor et al. | |

FOREIGN PATENT DOCUMENTS

| | | |
|---|---|---|
| CN | 87210843 U | 7/1988 |
| CN | 2138764 Y | 6/1993 |
| CN | 2153231 Y | 12/1993 |
| DE | 2206057 | 8/1973 |
| DE | 197 41 621 C 1 | 6/1999 |
| EP | 0433152 A1 | 12/1990 |
| EP | 0332624 B1 | 1/1992 |
| FR | 2690509 | 10/1993 |
| GB | 643363 | 9/1950 |
| JP | S51-90077 | 8/1976 |
| JP | S62-20653 | 2/1987 |
| JP | S63-164948 | 10/1988 |
| JP | 10137007 | 5/1998 |
| JP | 11104223 | 4/1999 |
| JP | 2000236914 | 9/2000 |
| WO | WO 92/05875 A1 | 4/1992 |
| WO | WO 96/04703 A1 | 2/1996 |
| WO | WO 99/07474 A1 | 2/1999 |
| WO | WO00/10713 A1 | 3/2000 |
| WO | WO01/47803 A1 | 7/2001 |
| WO | WO01/48781 A1 | 7/2001 |
| WO | WO01/64349 A1 | 9/2001 |
| WO | WO01/85348 A2 | 11/2001 |
| WO | WO02/20162 A2 | 3/2002 |
| WO | WO02/20163 A2 | 3/2002 |
| WO | WO02/30574 A1 | 4/2002 |
| WO | WO02/32578 A1 | 4/2002 |
| WO | WO02/42003 A1 | 5/2002 |
| WO | WO02/066167 A1 | 8/2002 |
| WO | WO03/009944 A1 | 2/2003 |
| WO | WO03/013620 A1 | 2/2003 |
| WO | WO 03/013734 AA | 2/2003 |

OTHER PUBLICATIONS

U.S. Appl. No. 10/405,193, filed Apr. 1, 2003, Lee et al.
Electrical schematic and promotional material available from Zenion Industries, 7 pages, Aug. 1990.
Promotional material available from Zenion Industries for the Plasma-Pure 100/200/300, 2 pages, Aug. 1990.
Promotional material available from Zenion Industries for the Plasma-Tron, 2 pages, Aug. 1990.
LENTEK Silā™ Plug-In Air Purifier/Deodorizer product box copyrighted 1999, 13 pages.
U.S. Appl. No. 60/104,573, filed Oct. 16, 1998, Krichtafovitch.
U.S. Appl. No. 60/306,479, filed Jul. 18, 2001, Taylor.
U.S. Appl. No. 60/341,179, filed Dec. 13, 2001, Taylor et al.
U.S. Appl. No. 60/340,702, filed Dec. 13, 2001, Taylor et al.
U.S. Appl. No. 60/341,377, filed Dec. 13, 2001, Taylor et al.
U.S. Appl. No. 60/341,518, filed Dec. 13, 2001, Taylor.
U.S. Appl. No. 60/340,288, filed Dec. 13, 2001, Taylor.
U.S. Appl. No. 60/341,176, filed Dec. 13, 2001, Taylor.
U.S. Appl. No. 60/340,462, filed Dec. 13, 2001, Taylor.
U.S. Appl. No. 60/340,090, filed Dec. 13, 2001, Taylor.
U.S. Appl. No. 60/341,433, filed Dec. 13, 2001, Taylor.
U.S. Appl. No. 60/341,592, filed Dec. 13, 2001, Taylor.
U.S. Appl. No. 60/341,320, filed Dec. 13, 2001, Taylor.
U.S. Appl. No. 60/391,070, filed Jun. 6, 2002, Reeves.
Blueair AV 402 Air Purifier, http://www.air-purifiers-usa.biz/Blueair_AV402.htm, 4 pp., 1996.
Blueair AV501 Air Purifier, http://www.air-purifiers-usa.biz/Blueair_AV501.htm, 15 pp., 1997.
ConsumerReports.org, "Air Cleaners: Behind the Hype," http://www.consumerreports.org/main/content/printable.jsp?FOLDER%3C%EFOLDER_id, Oct. 2003, 6 pp.
English Translation of German Patent Document DE 197 41 621 C1; Publication Date: Jun. 10, 1999.
English Translation of German Published Patent Application 2206057; Publication Date: Aug. 16, 1973.
English Translation of Japanese Unexamined Patent Application Bulletin No. S51-90077; Publication Date: Aug. 6, 1976.
English Translation of Japanese Unexamined Utility Model Application No. S62-20653; Publication Date: Feb. 7, 1987.
English Translation of Japanese Unexamined Utility Model Application No. S63-164948; Publication Date: Oct. 27, 1988.
Friedrich C-90A Electronic Air Cleaner, Service Information, Friedrich Air Conditioning Co., 12 pp., 1985.
Friedrich C-90A, "How the C-90A Works," BestAirCleaner.com http://www.bestaircleaner.com/faq/c90works.asp, 1 page, no date available.
"Household Air Cleaners," Consumer Reports Magazine, Oct. 1992, 6 pp.
LakeAir Excel and Maxum Portable Electronic Air Cleaners, Operating and Service Manual, LakeAir International, Inc., 11 pp., 1971.
Trion 120 Air Purifier, Model 442501-025, http://www.feddersoutled.com/trion120.html, 16 pp., believed to be at least one year prior to Nov. 5, 1998.
Trion 150 Air Purifier, Model 45000-002, http://www.feddersoutlet.com/trion150.html, 11 pp., believed to be at least one year prior to Nov. 5, 1998.
Trion 350 Air Purifier, Model 450111-010, http://www.feddersoutlet.com/trion350.html, 12 pp., believed to be at least one year prior to Nov. 5, 1998.
Trion Console 250 Electronic Air Cleaner, Model Series 442857 and 445600, Manual for Installation-Operation-Maintenance, Trion Inc., 7 pp., believed to be at least one year prior to Nov. 5, 1998.

* cited by examiner

ELECTRO-KINETIC AIR TRANSPORTER AND CONDITIONER DEVICES INCLUDING PIN-RING ELECTRODE CONFIGURATIONS WITH DRIVER ELECTRODE

CROSS-REFERENCE TO RELATED ART

The present invention is related to the following patent applications and patent, each of which is incorporated herein by reference: abandoned U.S. patent application Ser. No. 10/717,420, filed Nov. 19, 2003, entitled "Electro-Kinetic Air Transporter and Conditioner Devices with Insulated Driver Electrodes"; U.S. Pat. No. 7,077,890, entitled "Electrostatic Precipitators with Insulated Driver Electrodes"; abandoned U.S. patent application Ser. No. 10/074,207, filed Feb. 12, 2002, entitled "Electro-Kinetic Air Transporter-Conditioner Devices with Interstitial Electrodes"; abandoned U.S. patent application Ser. No. 10/074,827, filed Feb. 12, 2002; and U.S. Pat. No. 6,176,977, entitled "Electro-Kinetic Air Transporter-Conditioner".

FIELD OF THE INVENTION

The present invention relates generally to devices that electro-kinetically transport and/or condition air.

BACKGROUND OF THE INVENTION

It is known in the art to produce an airflow using electro-kinetic techniques, by which electrical power is converted into a flow of air without mechanically moving components. One such system was described in U.S. Pat. No. 4,789,801 to Lee (1988), depicted herein in simplified form as FIG. 1. System 100 includes a first array 110 of emitter electrodes 112 that are spaced-apart symmetrically from a second array 120 of collector electrodes 122. The positive terminal of a high voltage pulse generator 140 that outputs a train of high voltage pulses (e.g., 0 to perhaps +5 KV) is coupled to the first array 110, and the negative pulse generator terminal is coupled to the second array 120 in this example.

The high voltage pulses ionize the air between arrays 110 and 120, and create an airflow 150 from the first array 110 toward the second array 120, without requiring any moving parts. Particulate matter 160 in the air is entrained within the airflow 150 and also moves towards the collector electrodes 122. Some of the particulate matter is electrostatically attracted to the surfaces of the collector electrodes 122, where it remains, thus conditioning the flow of air exiting system 100. Further, the corona discharge produced between the electrode arrays can release ozone into the ambient environment, which can eliminate odors that are entrained in the airflow, but is generally undesirable in excess quantities.

In a further embodiment of Lee shown herein as FIG. 2, a third array 230 includes passive collector electrodes 232 that are positioned midway between each pair of collector electrodes 122. According to Lee, these passive collector electrodes 232, which were described as being grounded, increase precipitation efficiency. However, because the grounded passive collector electrodes 232 (also referred to hereafter as driver electrodes) are located close to adjacent negatively charged collector electrodes 122, undesirable arcing (also known as breakdown or sparking) may occur between collector electrodes 122 and driver electrodes 232 if the potential difference therebetween is too high, or if a carbon path is produced between an electrode 122 and an electrode 232 (e.g., due to a moth or other insect that got stuck between an electrode 122 and electrode 232).

Increasing the voltage difference between the driver electrodes 232 and the collector electrodes 122 is one way to further increase particle collecting efficiency and air flow rate. However, the extent that the voltage difference can be increased is limited because arcing will eventually occur between the collector electrodes 122 and the driver electrodes 232. Such arcing will typically decrease the collecting efficiency of the system.

Another system, known as a pin-ring type system was described with reference to FIG. 4I in U.S. Pat. No. 6,176,977 to Taylor et al. (2001), depicted herein in simplified form as FIG. 3. System 300 includes a first array 310 of one or more pin-shaped electrodes 312 that are spaced-apart from a second array 320 of one or more ring-like electrodes 322. The positive terminal of a high voltage pulse generator 340 is coupled to the first array 310, and the negative pulse generator terminal is coupled to the second array 320 in this example.

The high voltage ionizes the air between arrays 310 and 320, and create an airflow 350 from the first array 310 toward the second array 320, without requiring any moving parts. Particulate matter in the air is entrained within the airflow 350 and also moves towards the ring-like electrodes 322. Some of the particulate matter is electrostatically attracted to the surfaces of the ring-like electrodes 322, where it remains, thus conditioning the flow of air exiting system 300. Further, the corona discharge produced between the electrode arrays can release ozone into the ambient environment, which can eliminate odors that are entrained in the airflow, but is generally undesirable in excess quantities. While system 300 has proved to be very useful, especially where space is constrained, it would be useful if the collecting efficiency and/or air-flow rate of such a system could be improved.

DETAILED DESCRIPTION

Figure 1:
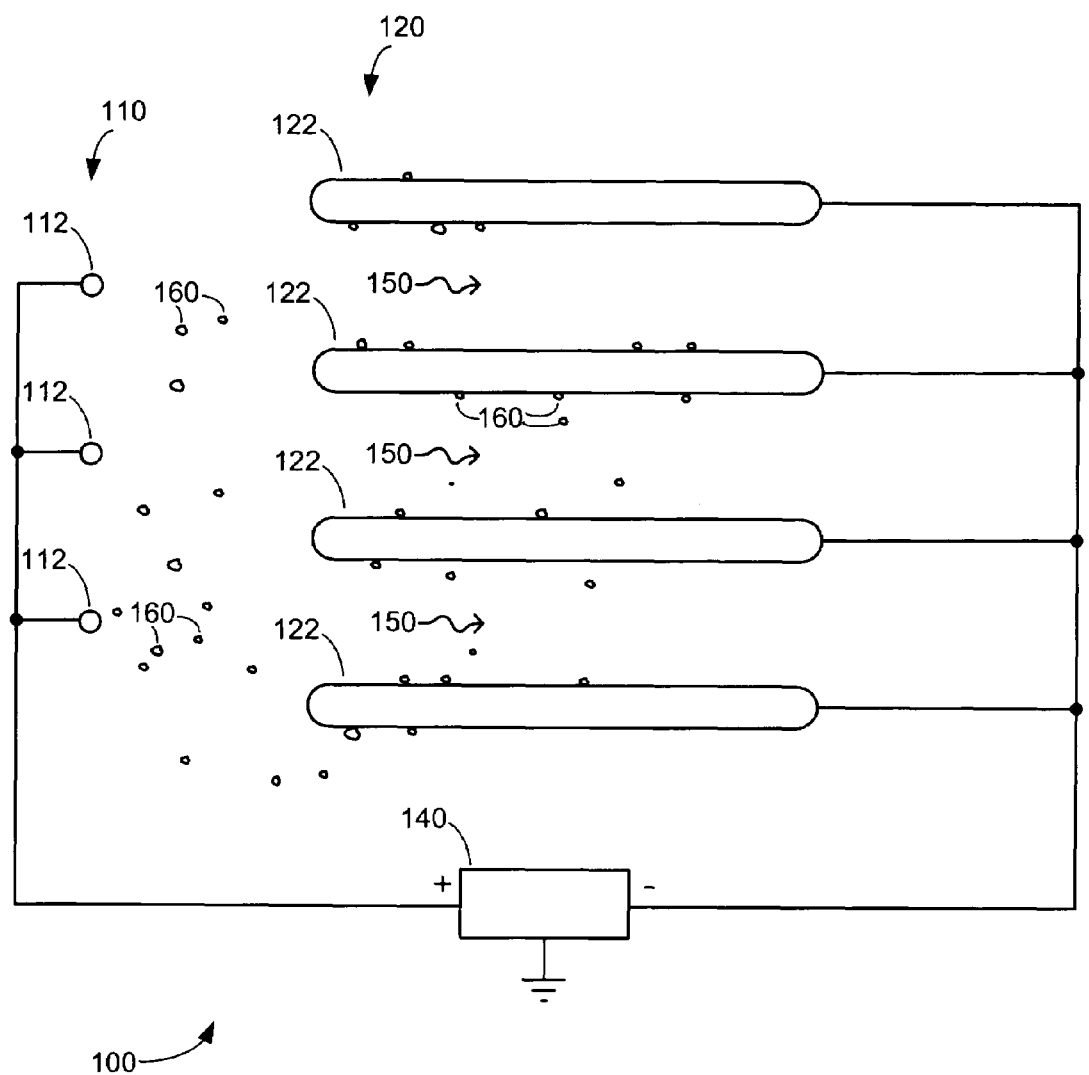
FIG. 1 illustrates schematically, a prior art electro-kinetic conditioner system.
Figure 2:
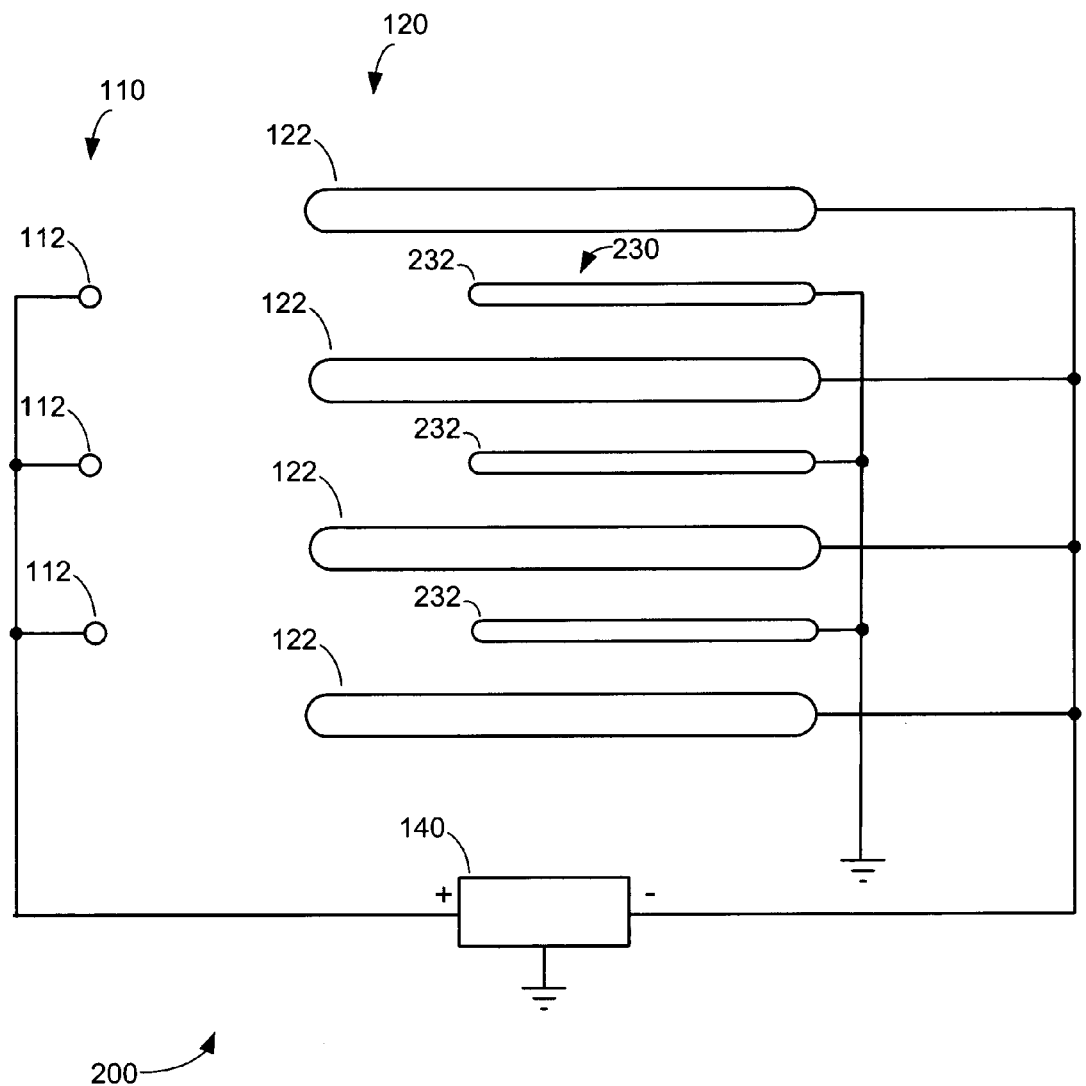
FIG. 2 illustrates schematically, a further prior art electro-kinetic conditioner system.
Figure 3:
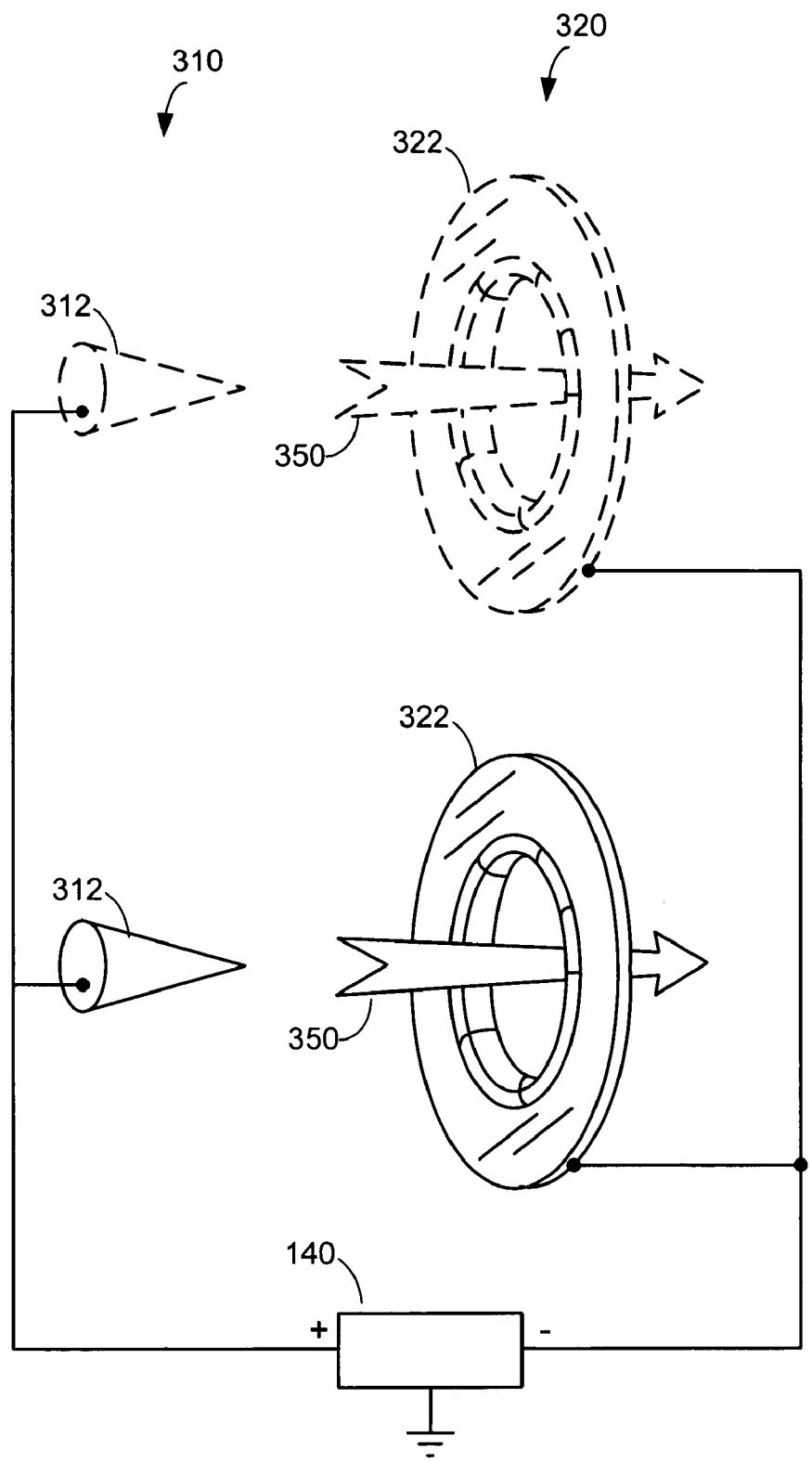
FIG. 3 illustrates, another prior art electro-kinetic conditioner system.

Embodiments of the present invention are related to electro-kinetic air transporter-conditioner systems and methods. In accordance with an embodiment of the present invention, a system includes at least one pin emitter electrode and at least one ring collector electrode that is downstream from the emitter electrode. A driver electrode is located within the interior of the collector electrode. Preferably, although not necessarily, the driver electrode is insulated. A high voltage source provides a voltage potential to at least one of the emitter electrode and the collector electrode to thereby provide a potential different therebetween. The driver electrode may or may not be at a same voltage potential as the emitter electrode, but should be at a different voltage potential than the collector electrode.

Insulation on the driver electrode allows the voltage potential to be increased between the driver and collector electrodes, to a voltage potential that would otherwise cause arcing if the insulation were not present. This increased voltage potential increases particle collection efficiency. Additionally, the insulation will reduce, and likely prevent, any arcing from occurring if a carbon path is formed between the collector electrode and driver electrode, e.g., due to an insect getting caught therebetween.

In accordance with an embodiment of the present invention, the emitter electrode and the driver electrode are grounded, while the high voltage source is used to provide a high voltage potential to the collector electrode (e.g., −16KV). This is a relatively easy embodiment to implement since the high voltage source need only provide one polarity.

In accordance with an embodiment of the present invention, the emitter electrode is at a first voltage potential, the collector electrode is at a second voltage potential different than the first voltage potential, and the driver electrode is at a third voltage potential different than the first and second voltage potentials. One of the first, second and third voltage potentials can be ground, but need not be. Other variations, such as the emitter electrode and driver electrode being at the same voltage potential (ground or otherwise) are within the scope of the invention.

It is within the scope of the invention to have an upstream end of the driver electrode substantially aligned with or set forward a distance from the upstream end of the ring collector electrode. However, the upstream end of the driver electrode is preferably set back a distance from the upstream end of the ring collector electrode. More specifically, the driver is preferably setback a sufficient distance such that the electric field between the emitter and collector electrodes does not interfere with the electric field between the driver and collector electrode, and vice versa.

An insulated driver electrode includes an underlying electrically conductive electrode that is covered with insulation, e.g., a dielectric material. The dielectric material can be, for example, a heat shrink tubing material or an insulating varnish type material. In accordance with an embodiment of the present invention, the dielectric material is coated with an ozone reducing catalyst. In accordance with another embodiment of the present invention, the dielectric material includes or is an ozone reducing catalyst.

The embodiments as describe above have some or all of the advantages of increasing the particle collection efficiency, increasing the rate and/or volume of airflow, reducing arcing, and/or reducing the amount of ozone generated. Further, ions generated using many of the embodiments of the present invention will be more of the negative variety as opposed to the positive variety.

Other features and advantages of the invention will appear from the following description in which the preferred embodiments have been set forth in detail, in conjunction with the accompanying drawings and claims.

Figure 4A:
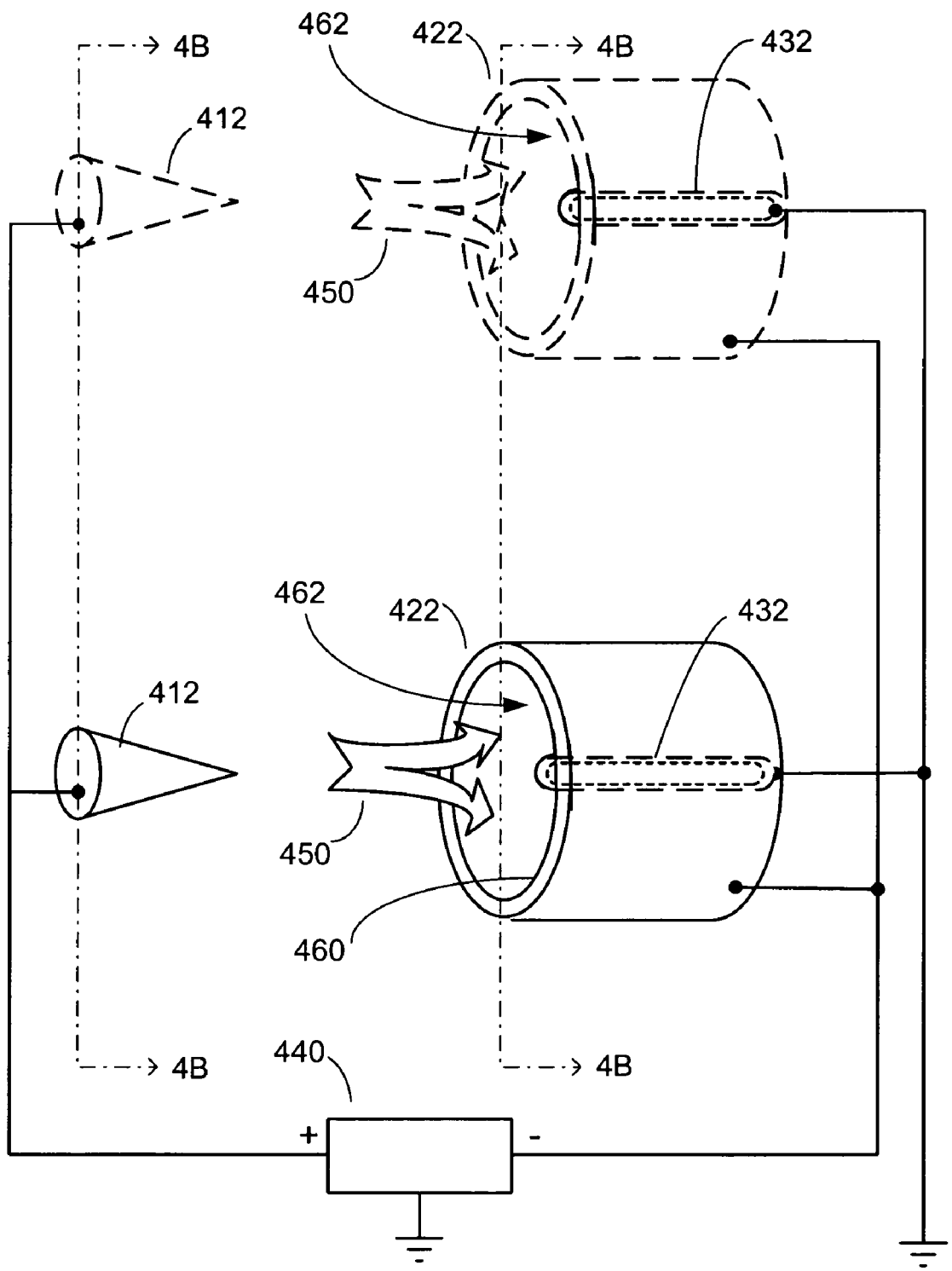
FIGS. 4A and 4B illustrate an electro-kinetic conditioner system according to an embodiment of the present invention.
Figure 4B:
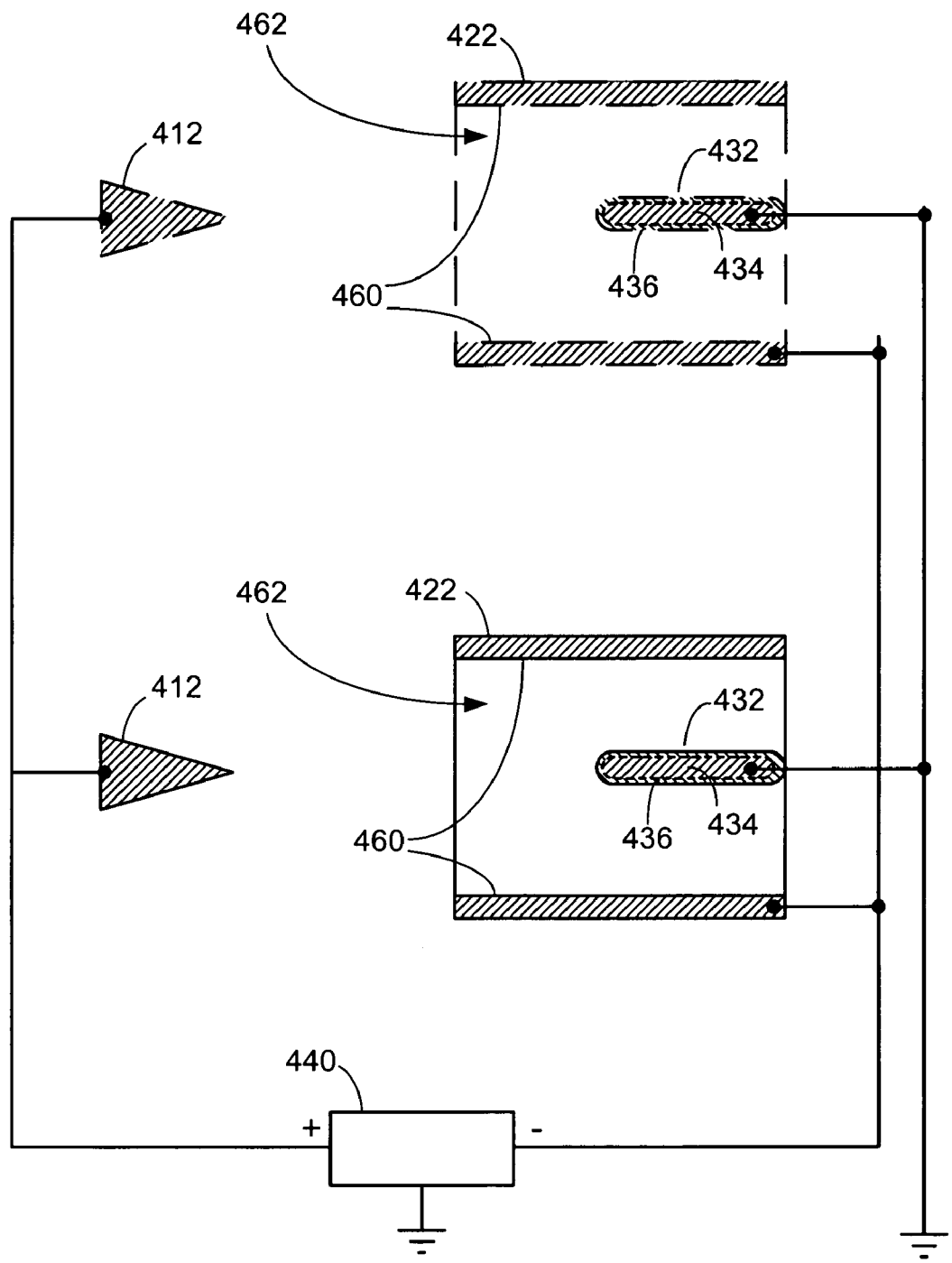

FIG. 4A shows a perspective view of an electro-kinetic conditioner system 400 according to an embodiment of the present invention. FIG. 4B is a cross-sectional side view of the system 400 shown in FIG. 4A. The system 400 includes a pin emitter electrode 412, a ring collector electrode 422 and a driver electrode 432. The driver electrode 432 is located within (at least partially within) an interior 462 of the ring collector electrode 422. There need only be one pin emitter electrode 412, one ring collector electrode 422 and one driver electrode 432. Accordingly, the upper group of electrodes is shown in dashed lines. However, it should also be understood that there could be two or more groups of electrodes (i.e., electrodes 412, 422 and 432 can be repeated two or more times to produce a column, row, matrix, or other configuration of groups of electrodes).

The driver electrode 432 is preferably insulated with a dielectric material, thereby forming an insulated driver electrode, as shown in FIGS. 4A and 4B. However, the present invention also encompasses embodiments where the driver electrode 432 is not insulated. Increased particle collection efficiency should still be achieved using an un-insulated driver electrode 432. However, undesirable arcing (also known as breakdown or sparking) may more easily occur between the driver electrode and the surrounding ring collector electrode 422 (e.g., if the potential difference therebetween is too high, or if a carbon path is produced between the electrodes, e.g., due to a moth or other insect getting stuck between the driver and collector electrodes). The insulation 436 (e.g., dielectric material) on the driver electrode 432 allows the voltage potential to be increased between the driver electrode and collector electrode, to a voltage potential that would otherwise cause arcing if the insulation were not present. This increased voltage potential further increases particle collection efficiency, as will be described below. Additionally, the insulation will reduce, and likely prevent, any arcing from occurring if a carbon path is formed between the collector electrode 422 and driver electrode 432, e.g., due to an insect getting caught therebetween. Accordingly, while a majority of the remaining discussion will refer to the driver electrode 432 as being an insulated driver electrode, it should be understood that the driver electrode 432 may not be insulated.

For simplicity, only the lower group of electrodes 412, 422 and 432 will be discussed. One of ordinary skill in the art will appreciate that the upper group of electrodes 412, 422 and 432 can be arranged in a similar manner and will operate in a similar manner.

In the embodiment shown, the pin emitter electrode 412 (similar to electrode 312) is shown as being connected to a positive terminal of a high voltage source 440 (similar to voltage source 120), and the collector electrode 432 is shown as being connected to a negative terminal of the high voltage source 440. The insulated driver electrode 432 is shown as being grounded.

As shown in FIG. 4B, the insulated driver electrode 432 includes an electrically conductive electrode 434 that is covered by a dielectric material 436. (In embodiments where the driver electrode 432 is not insulated, the driver electrode would simply include the electrically conductive electrode 434.) In accordance with an embodiment of the present invention, the dielectric material 436 is heat shrink material. During manufacture, the heat shrink material is placed over the electrically conductive electrode 434 and then heated, which causes the material to shrink to the shape of the electrode 434. An exemplary heat shrinkable material is type FP-301 flexible polyolefin material available from 3M of St. Paul, Minn.

In accordance with another embodiment of the present invention, the dielectric material 436 is an insulating varnish, lacquer or resin. For example, a varnish, after being applied to the surface of the underlying electrode 434, dries and forms an insulating coat or film a few mil (thousands of an inch) in thickness covering the electrode 434. The dielectric strength of the varnish or lacquer can be, for example, above 1000 V/mil (one thousands of an inch). Such insulating varnishes, lacquer and resins are commercially available from various sources, such as from John C. Dolph Company of Monmouth Junction, N.J., and Ranbar Electrical Materials Inc. of Manor, Pa.

Other possible dielectric materials that can be used to insulate the driver electrode include ceramic or porcelain enamel or fiberglass. These are just a few examples of dielectric materials that can be used to insulate the driver electrode 432. It is within the spirit and scope of the present invention that other insulating dielectric materials can be used to insulate the driver electrode.

During operation of system 400, the high voltage source 440 produces a high voltage potential between the emitter electrode 412 and the ring collector electrode 422. More specifically, in the embodiment shown in FIGS. 4A and 4B, the high voltage source 440 positively charges the emitter electrode 412 and negatively charges the collector electrode 422. For example, the voltage on the emitter electrode 412 can be +6KV, while the voltage on the collector electrode 422 can be −10KV, resulting in a 16KV potential difference between the emitter electrode 412 and collector electrode 422. This potential difference will produces a high intensity electric field that is highly concentrated around the distal tip of the emitter electrode 412, which generally faces the collector electrode 422. More specifically, a corona discharge takes place from the distal tip of the emitter electrode 412 to the upstream portion of the collector electrode 422, producing positively charged ions. Particles (e.g., dust particles) in the vicinity of the emitter electrode 412 are positively charged by the ions. The positively charged ions are repelled by the positively charged emitter electrode 412, and are attracted to and deposited predominantly on the inner surface 460 of the negatively charged collector electrode 422.

A further electric field is produced between the driver electrode 432 and the collector electrode 422, which push the positively charged particles toward the inner surface 460 of the collector electrode 422. Generally, the greater this electric field between the driver electrode 432 and the collector electrode 422, the greater the particle collection efficiency. If the driver electrode 432 were not insulated, then the extent that this voltage difference (and thus, the electric field) could be increased would be limited because arcing would occur between the collector electrode 422 and the un-insulated driver electrode beyond a certain voltage potential difference. However, the insulation 436 covering the underling electrode 434 significantly increases the voltage potential difference that can be obtained between the collector electrode 422 and the driver electrode 432 without arcing. The increased potential difference results in an increase electric field, which increases particle collecting efficiency. By analogy, the insulation 436 works much the same way as a dielectric material works in a capacitor. That is, even though a capacitor can be created with only an air gap between a pair of differently charged conductive surfaces, the electric field can be significantly increased by placing a dielectric material between the conductive surfaces.

In FIGS. 4A and 4B, the emitter electrode 412 is shown as receiving a positive voltage potential, the collector electrode 422 receives a negative voltage potential, and the insulated driver electrode 432 is grounded. However, other voltage potential variations can be used to drive the electro-kinetic system 400 in a similar manner as described above. Such other voltage potential variations will also produce a flow of ionized air from the emitter electrode 412 toward the collector electrode 422, so long as a high voltage is provided therebetween. Similarly, so long as a high voltage potential exists between the driver electrode 432 and the collector electrode 422, the driver electrode 432 will help increase collecting efficiency by pushing charged particles in the airflow toward the inside surface 460 of the collector electrode 422.

Figure 4C:
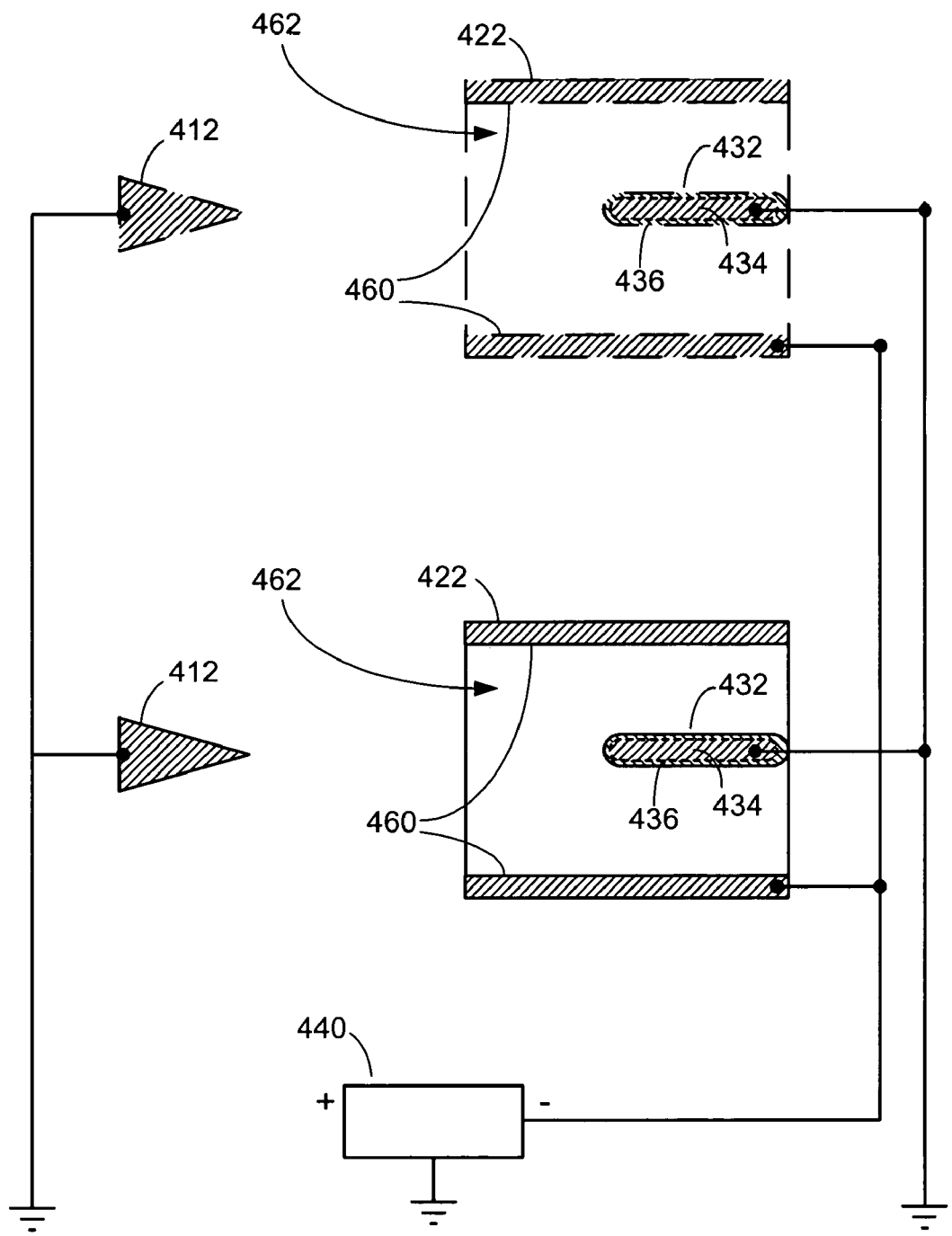
FIGS.4C-4E illustrate various embodiments of the electro-kinetc conditioner system of the present invention.

For example, the emitter electrode 412 and the driver electrode 432 can be grounded, while the collector electrode 422 receives a high voltage potential, as shown in FIG. 4C. Such an embodiment is advantageous because the emitter electrode 412 will be generally at the same potential as the floor and walls of a room within which system is placed, reducing the chance that charged particles may flow backward, i.e., away from the collector electrode. Another advantage of a system with this voltage arrangement is that only a single polarity voltage supply is needed (e.g., voltage source 440 need only provide a −16KV potential, without requiring any positive supply potential). Thus, a system using this voltage configuration is relatively simple to design, build and manufacture, making it a very cost effective system.

Figure 4D:
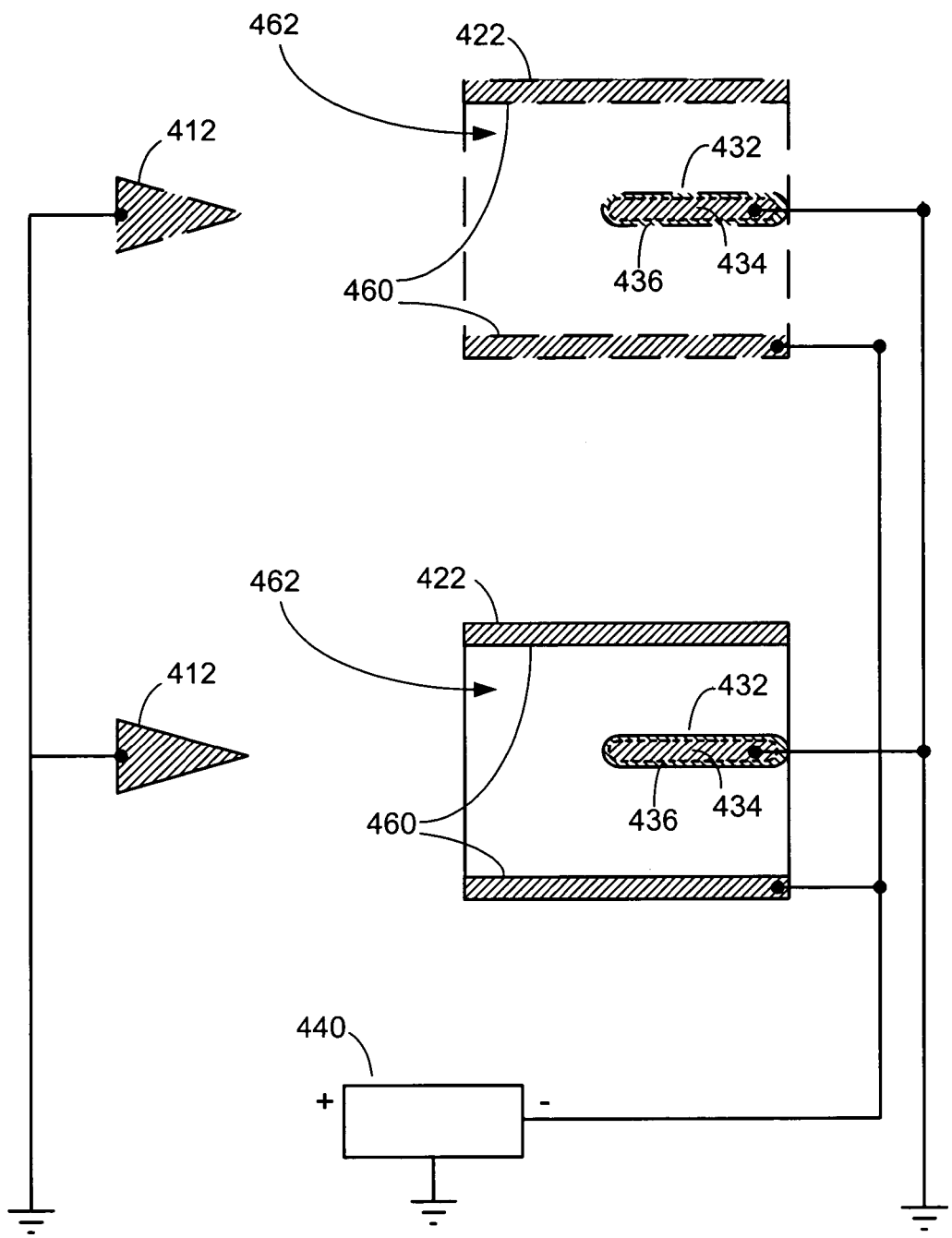
Figure 4E:
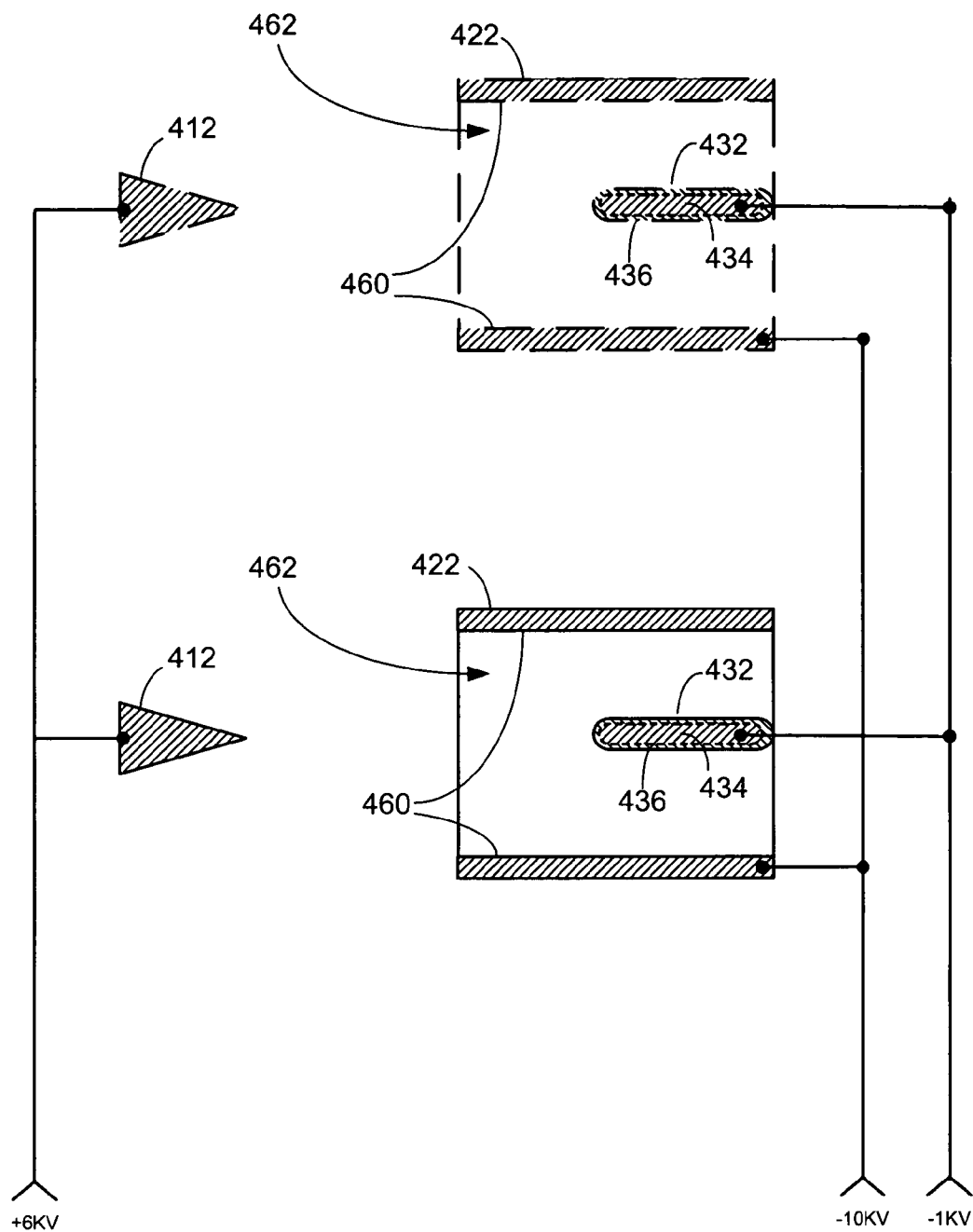

In another example, the emitter electrode 412 and the driver electrode 432 can be grounded, while the collector electrode 422 has a high negative voltage potential, as shown in FIG. 4D, or a high positive voltage potential. In another example embodiment, the emitter electrode 412 is positive (e.g., 6KV), the driver electrode 432 is slightly negative (e.g., −1KV), and the collector electrode 422 is significantly more negative (e.g., −10KV), as shown in FIG. 4E. Other variations are also possible while still being within the spirit as scope of the present invention. It is also possible that the instead of grounding certain portions of the electrode arrangement, the entire arrangement can float (e.g., the driver electrode 432 and the emitter electrode 412 can be at a floating voltage potential, with the collector electrode 422 offset from the floating voltage potential).

If desired, the voltage potential of the emitter electrode 412 and driver electrode 432 can be independently adjusted. This allows for corona current adjustment (produced by the electric field between the emitter electrode 412 and collector electrode 422) to be performed independently of the adjustments to the electric field between the driver electrode 432 and collector electrode 422. More specifically, this allows the voltage potential between the emitter electrode 412 and collector electrode 422 to be kept below arcing levels, while still being able to independently increase the voltage potential between the driver electrode 432 and collector electrode 422 to a higher voltage potential difference than may be possible between the emitter 412 and collector 422.

Figure 5:
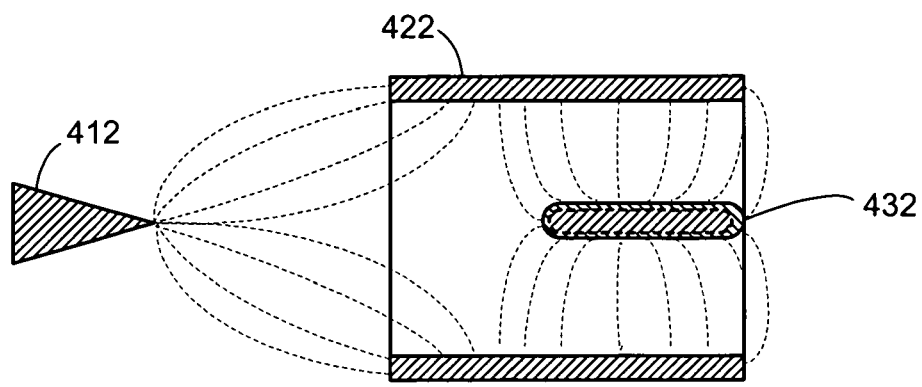
FIG. 5 illustrates exemplary electrostatic field lines produced using embodiments of the present invention.

The electric field produced between the emitter electrode 412 and collector electrode 422 (also referred to as the ionization region), and the electric field produced between the driver electrode 432 and the collector electrode 422 (also referred to as the collector region), are show as exemplary dashed lines in FIG. 5. The ionization region produces ions and cause air movement in a downstream direction from the emitter electrode 412 toward the collector electrode 422. Because the charged particles have an opposite polarity than the polarity of the collector electrode 422, the charged particles will be attracted to the inner surface 460 of the collector electrode 422 and a portion of the charged particles will collect on the inner surface 460 (also referred to as the interior surface) of the collector electrode 422, thereby cleaning the air.

Without the driver electrode 432, a percentage of the charged particles in the airflow may escape through the ring collector electrode 422 without being collected on the inner surface 460 of the collector electrode 422. The use of a driver electrode will increase the particle collection efficiency (i.e., reduce the percentage of particles that escape through the ring collector electrode 422) by pushing particles in air flow toward the inside surface 460 of the collector electrode 422. As mentioned above, the driver electrode 432 is preferably insulated. The insulation on the driver electrode 432 allows the voltage potential to be increased between the driver electrode 432 and the collector electrode 422, to a voltage potential that would otherwise cause arcing if the insulation were not present. This increased voltage potential will further increase particle collection efficiency. Additionally, as mentioned above, the insulation will reduce, and likely prevent, any arcing from occurring if a carbon path is formed between the collector and driver electrodes, e.g., due to an insect getting caught therebetween.

Figure 6:
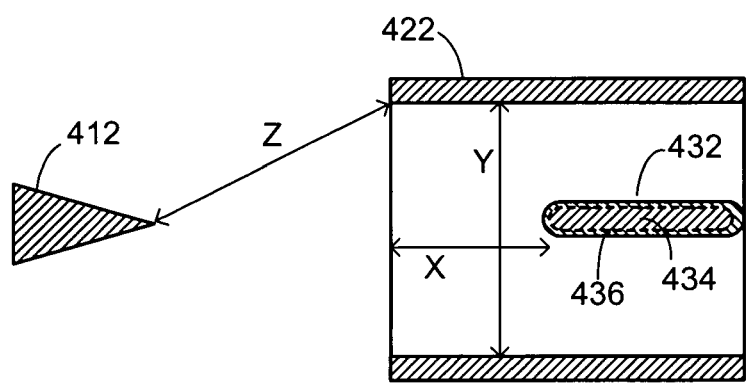
FIG. 6 illustrates the relative distances between various electrodes of the electro-kinetic conditioner systems of the present invention.

It is preferably that the electric field produced between the driver electrode 432 and the collector electrode 422 (i.e. the collecting region) does not interfere with the electric field between the emitter electrode 412 and the collector electrode 422 (i.e., the ionization region). If this were to occur, the electric field in the collecting region might reduce the intensity of the electric filed in the ionization region, thereby reducing the production of ions and slowing down air movement. Accordingly, the leading end (i.e., upstream end) of the driver electrode 432 is preferably set back (i.e., downstream) from the leading end of the collector electrode 422 by a distance that is about the same as the diameter of the ring collector electrode 422. This is shown in FIG. 6, where the setback distance X of the driver electrode 432 is approximately equal to the diameter Y of the ring collector electrode 422. Still referring to FIG. 6, it is also desirable to have the distance Z between the emitter electrode 412 and the collector electrode 422 to be about equal to the diameter Y of the ring collector electrode. However, other set back distances, diameters, and distances between emitter and collector electrodes are also within the spirit and scope of the present invention.

As explained above, the emitter electrode 412 and the driver electrode 432 may or may not be at the same voltage potential, depending on which embodiment of the present invention is practiced. When at the same voltage potential, there will be no problem of arcing occurring between the emitter electrode 412 and the driver electrode 432. Further, even when at different potentials, because the driver electrode 432 is setback as described above, the collector electrode 422 will shield the driver electrode 432, as can be appreciated from the electric field lines shown in FIG. 5. Thus, as shown in FIG. 5, there is generally no electric field produced between the emitter electrode 412 and the driver electrode 432. Accordingly, arcing should not occur therebetween.

In addition to producing ions, the systems described above will also produce ozone ($O_3$). While limited amounts of ozone are useful for eliminating odors, concentrations of ozone beyond recommended levels are generally undesirable. In accordance with embodiments of the present invention, ozone production is reduced by coating the driver electrode 432 with an ozone reducing catalyst. Exemplary ozone reducing catalysts include manganese dioxide and activated carbon. Commercially available ozone reducing catalysts such as PremAir™ manufactured by Englehard Corporation of Iselin, N.J., can also be used.

Some ozone reducing catalysts are electrically conductive, while others are not electrically conductive (e.g., manganese dioxide). If the desire is to provide a non-insulated driver electrode 432, then the underling electrically conductive electrode 434 can be coated in any available matter with an electrically conductive ozone reducing catalyst. However, if the desire is to provide an insulated driver electrode 432, it is important that an electrically conductive catalyst does not interfere with the benefits of insulating the driver. This will be described with reference to FIG. 7. When using a catalyst that is not electrically conductive to coat an insulated driver electrode 432, the insulation 436 can be applied in any available manner because the catalyst will act as an additional insulator, and thus not defeat the purpose of adding the insulator 436.

Figure 7:
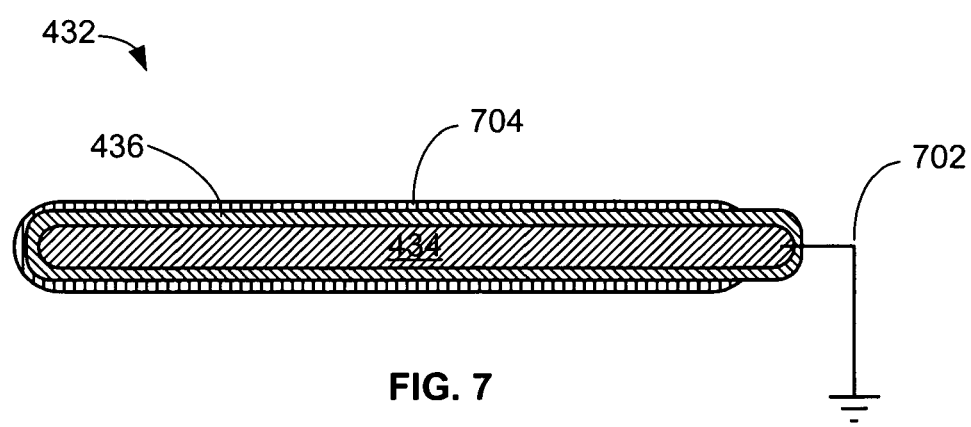
FIG. 7 illustrates a driver electrode that is coated with an ozone reducing catalyst, according to an embodiment of the present invention.

Referring now to FIG. 7, to produce an insulated driver electrode 432, the underlying electrode 434 is covered by the dielectric insulation 436, as has been mentioned above. The underlying electrode 434 is shown as being connected by a wire 702 (or other conductor) to a voltage potential (ground in this example). In this embodiment, an ozone reducing catalyst 704 covers most of the insulation 436. If the ozone reducing catalyst does not conduct electricity, then the ozone reducing catalyst 704 may contact the wire or other conductor 702 without negating the advantages provided by insulating the underlying driver electrode 434. However, if the ozone reducing catalyst 704 is electrically conductive, then care must be taken so that the electrically conductive ozone reducing catalyst 704 (covering the insulation 436) does not touch the wire or other conductor 702 that connects the underlying electrode 434 to a voltage potential (e.g., ground, a positive voltage, or a negative voltage). So long as an electrically conductive ozone reducing catalyst is spaced far enough from the wire 704 to prevent voltage breakdown therebetween, then the potential of the electrically conductive ozone reducing catalyst will remain floating, thereby still allowing an increased voltage potential between insulated driver electrode 432 and the ring collector electrode 422. Other examples of electrically conductive ozone reducing catalysts include, but are not limited to, noble metals.

In accordance with another embodiment of the present invention, if the ozone reducing catalyst is not electrically conductive, then the ozone reducing catalyst can be included in, or used as, the insulation 436. Preferably the ozone reducing catalysts should have a dielectric strength of at least 1000 V/mil (one-hundredth of an inch) in this embodiment.

When charged particles travel from the region near the emitter electrode 412 toward the collector electrode 422, the particles are either missing electrons or have extra electrons. In order to clean the air, it is desirable that the particles stick to the collector electrode 422 (which can later be cleaned). Accordingly, it is desirable that the exposed surfaces of the collector electrode 422 are electrically conductive so that the collector electrode 422 can give up a charge (i.e., an electron) or accept a charge, thereby causing the particles to stick to the collector electrode 422. Accordingly, if an ozone reducing catalyst is electrically conductive, the collector electrode 422 can be coated with the catalyst. However, it is preferably to coat the driver electrode 432 with an ozone reducing catalyst, rather than the collector electrode 422. This is because as particles collect on the interior surface 460 of the collector electrode 422, the surface becomes covered with the particles, thereby reducing the effectiveness of the ozone reducing catalyst. The driver electrode 432, on the other hand, does not collect particles. Thus, the ozone reducing effectiveness of a catalyst coating the driver electrode 432 will not diminish due to being covered by particles.

In accordance with an embodiment of the present invention, the pin emitter 412 electrode is generally coaxially arranged with the opening through the ring collector electrode 422, and generally in-line with the driver electrode 432. The pin emitter electrode 412 can taper from its base toward its apex, as shown in the FIGS. The pin emitter electrode 412 can be generally conical, as shown in the FIGS. Alternatively, the pin emitter electrode 412 can be a generally triangular yet flat (i.e., wedge shaped). In another embodiment, the pin emitter electrode 412 can be a wire with its insulation stripped off at its distal end. In still another embodiment, the pin emitter electrode 412 resembles the shape of a needle. The pin emitter electrode 412 can alternatively be pyramidal. These are just a few exemplary shapes for the pin emitter electrode, which are not meant to be limiting. In accordance with an embodiment of the present invention, the distal tip of the pin emitter electrode 412 can be somewhat rounded, rather than being sharp, to reduce the amount of ozone created by the pin emitter electrode 412. The pin emitter electrode 412 can be made from metal, e.g., tungsten. Tungsten is sufficiently robust in order to withstand cleaning, has a high melting point to retard breakdown due to ionization, and has a rough exterior surface that seems to promote efficient ionization. However, other materials besides tungsten can be used to produce the emitter electrode 412.

The ring collector electrode 422 is shown in the FIGS. as having a generally round circumference. However, the ring collector electrode 422 can have other shapes, such as oval, racetrack shaped, hexagonal, octagonal, square or rectangular. The collector electrode 422 can be manufactured in various manners, such as from metal tubing, or from sheet metal that is formed into the desired configuration. In accordance with an embodiment of the present invention, the exposed surfaces (including the interior surface 460) of the collector electrode 422 are highly polished to minimize unwanted point-to-point radiation. A polished surface also promotes ease of electrode cleaning. Other shapes, methods of manufacture and materials are also within the spirit and scope of the present invention.

The underlying conductive portion 434 of the driver electrode 432 is likely a wire or rod like electrode, but is not limited to those shapes. In accordance with an embodiment of the invention, an insulated driver electrode 432 can simply be a piece of insulated wire. In such an embodiment, the upstream end of the wire (which faces the pin emitter electrode 412) should be insulated. Thus, if the insulated driver electrode is made by cutting an insulated wire to an appropriate length, the exposed end of the wire that will face the pin emitter electrode 412 should be appropriately insulated. Various exemplary types of insulation, as well as ways of applying the insulation have been discussed above. However, other types of insulation and ways of applying the insulation are also within the spirit and scope of the present invention.

As mentioned above, the upstream end of the driver electrode 432 is preferably set back (i.e., downstream) from the upstream end of the ring collector electrode 422. The downstream end of the driver electrode 432 can be even with the down stream end of the ring collector electrode 422, as shown in the FIGS. Alternatively, the downstream end the driver electrode 432 can be slightly upstream or downstream from the downstream end of the ring collector electrode 422. Where there is only one driver electrode 432 within (at least partially within) the interior 462 of the ring collector electrode 422, it is preferred that the driver electrode 432 is generally radially centered within the ring collector electrode 432, and generally parallel with the interior surface 460 of the ring collector electrode 422, as shown in FIGS. 4-6.

Figure 8:
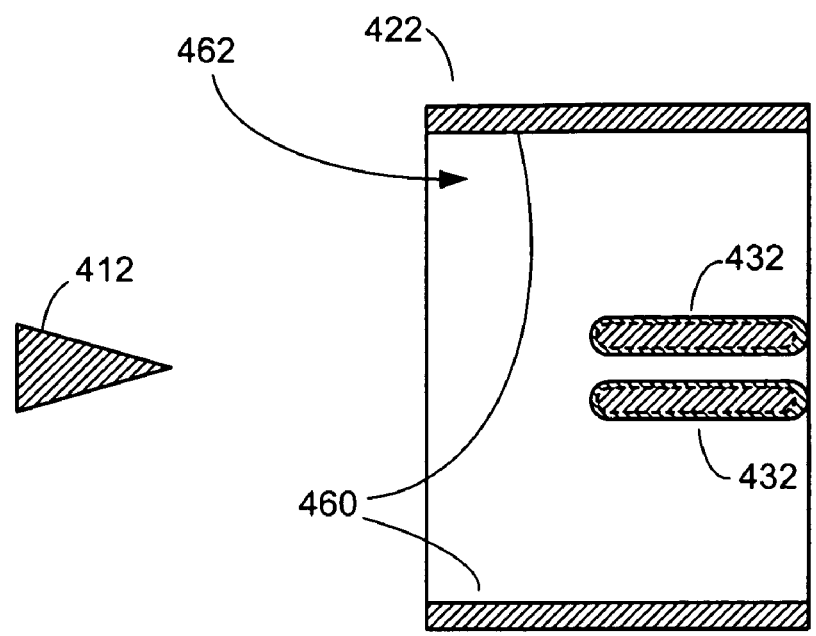
FIG. 8 illustrates an electro-kinetic conditioner system according to another embodiment of the present invention.
Figure 9:
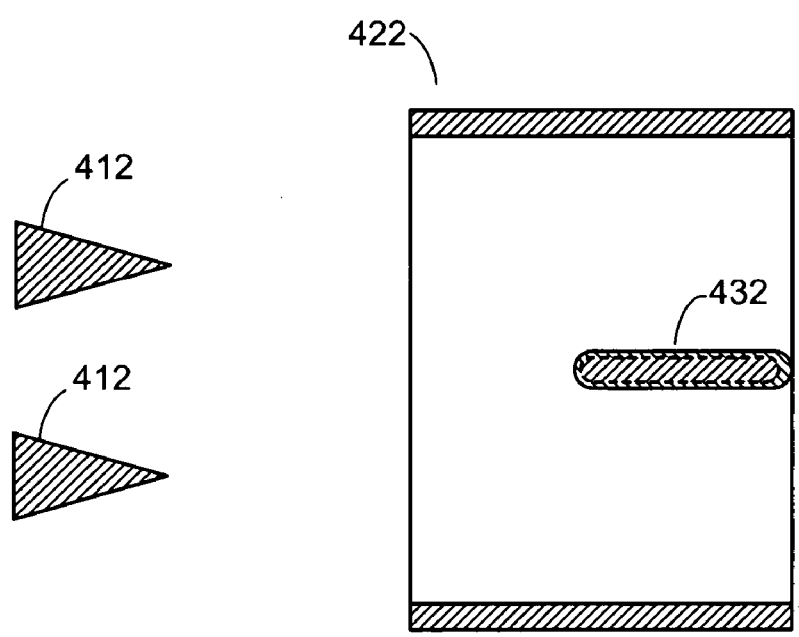
FIG. 9 illustrates an electro-kinetic conditioner system according to further embodiment of the present invention.
Figure 10:
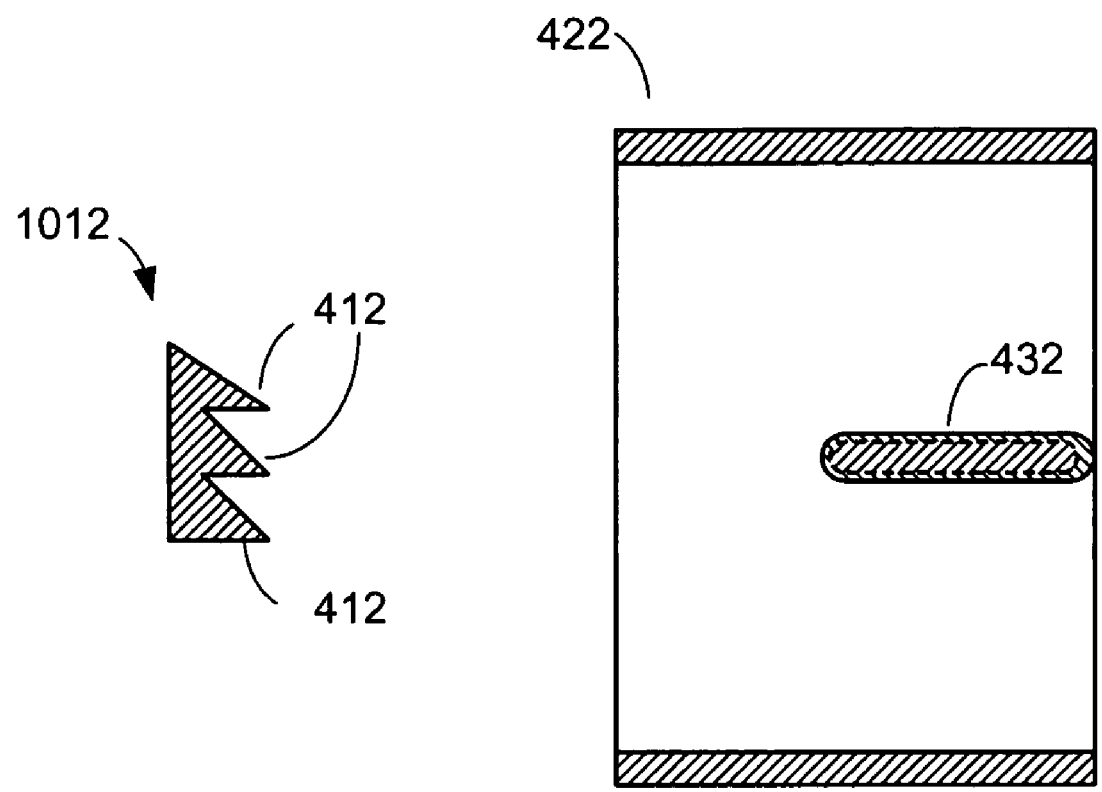
FIG. 10 illustrates an electro-kinetic conditioner system according to still another embodiment of the present invention.
Figure 11:
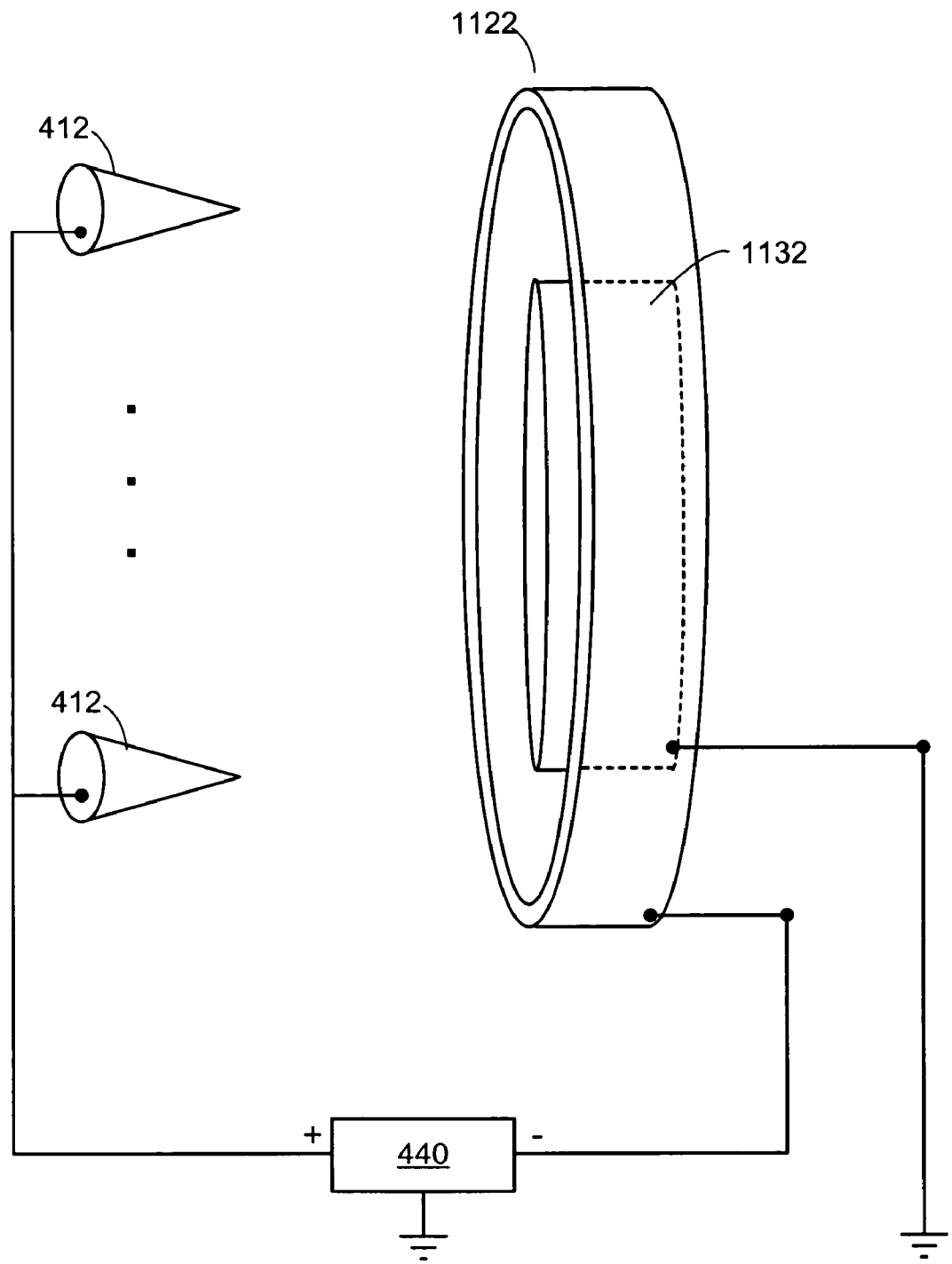
FIG. 11 illustrates an electro-kinetic conditioner system according to an embodiment of the present invention.

In the FIGS. discussed above, each emitter electrode 412 was shown as being associated with one collector electrode 422 and one driver electrode 432. However, there are other possible configurations that also within the scope of the present invention. For example, as shown in FIG. 8, more then one driver electrode 432 can be located within the ring collector electrode 422. As shown in FIG. 9, more than one pin emitter electrode 412 can be associated with a one ring collector electrode 422. Alternatively, a sawtooth like emitter electrode 1012 can provide the plurality of pin emitter electrodes 412, as shown in FIG. 10.

Where a column of two or more pin emitter electrodes 412 is used, in order to maintain a more even ionization region between the emitters 412 and the collector 422, it is preferably to use an oval, racetrack or otherwise elongated shaped ring collector electrode 1122, as shown in FIG. 11. Similarly, where an oval, racetrack or otherwise elongated shaped ring collector electrode 1122 is used, it is preferable to use a column of two or more pin emitter electrodes 412. As also shown in FIG. 11, where an oval, racetrack or otherwise elongated shaped ring collector electrode 1122 is used, an elongated driver electrode 1132, which is preferably insulated, can be used. Alternatively, a plurality of driver electrodes 432 can be used to mirror the plurality of pin emitter electrodes 412.

Figure 12A:
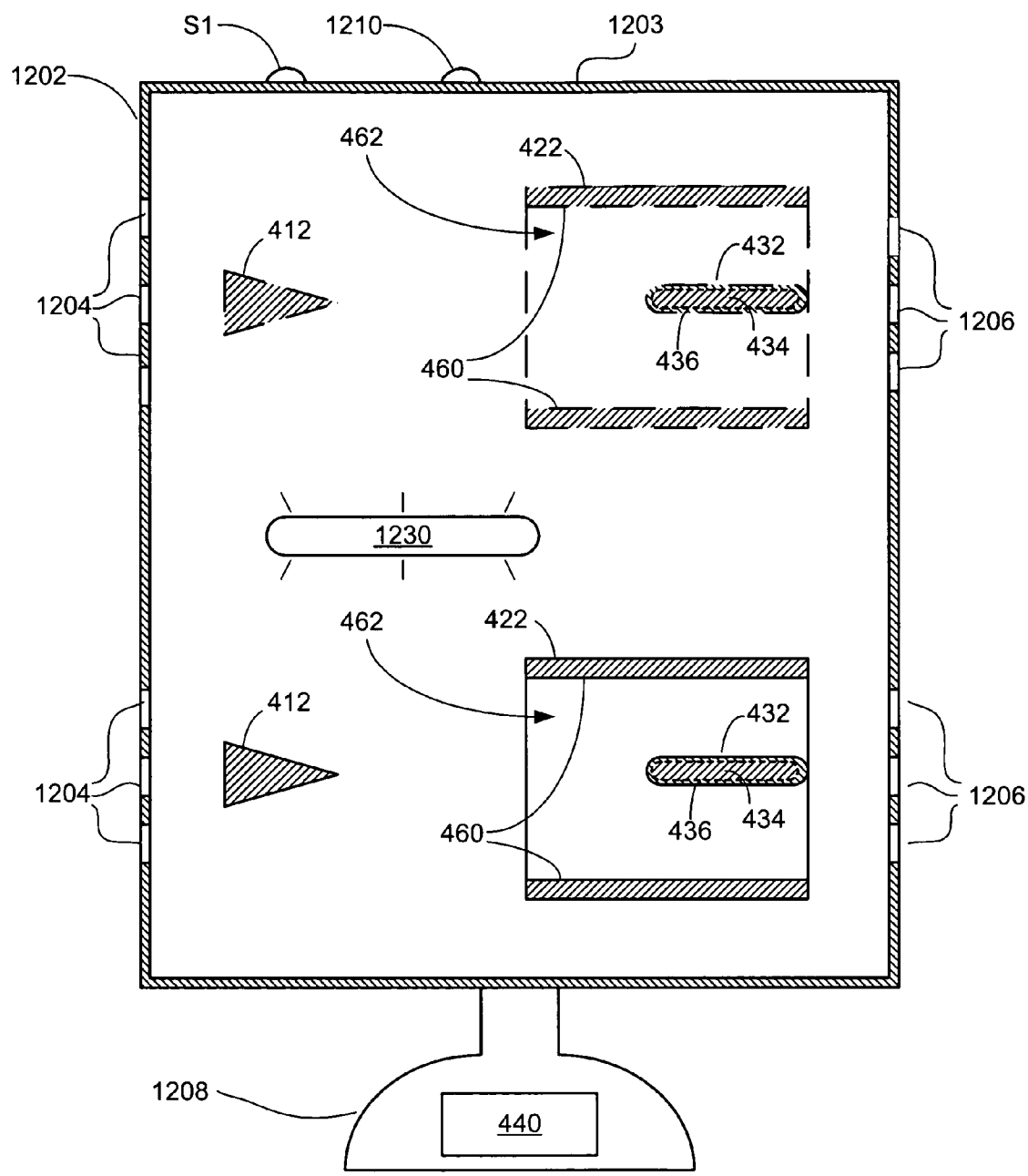
FIGS. 12A and 12B illustrate cross sections of housings including electro-kinetic conditioner systems, according to embodiments of the present invention.

Referring now to FIG. 12A, the above described electro-kinetic air transporter-conditioner systems are likely within or include a free-standing housing 1202. The housing likely includes one or more intake vents 1204 and one or more outlet vents 1206, and a base pedestal 1208. The housing 1202 can be upstandingly vertical and/or elongated. The base 1208 in FIG. 12A, which may be pivotally mounted to the remainder of the housing 1202, allows the housing 1202 to remain in a vertical position.

Internal to the transporter housing 1202 is one of the electro-kinetic transporter and conditioner systems described above. The electro-kinetic transporter and conditioner system is likely powered by an AC:DC power supply that is energizable or excitable using switch S1. Switch S1, along with the other user operated switches such as a control dial 1210, are preferably located on or near a top 1203 of the housing 1202. The whole system is self-contained in that other than ambient air, nothing is required from beyond the transporter housing 1202, except perhaps an external operating potential, for operation of the present invention.

There need be no real distinction between vents 1204 and 1206, except their location relative to the electrodes. These vents serve to ensure that an adequate flow of ambient air can be drawn into or made available to the electrodes, and that an adequate flow of ionized cleaned air moves out from housing 1202. The input and/or output vents 1204 and 1206 can be located in a grate, panel, or the like, which can be removed from the housing 1202, to thereby provide access to the electrodes for cleaning. It is also possible that some or all of the electrodes can be removed from the housing 1202 to allow for cleaning of the electrode(s) to occur outside the housing 1202.

The above described embodiments do not specifically include a germicidal (e.g., ultra-violate) lamp. However, a germicidal (e.g., ultra-violet) lamp 1230, can be located upstream from, downstream from and/or adjacent the electrodes, to destroy germs within the airflow. It is even possible that the lamp be located partially or fully within the interior of a ring electrode 422, depending on the size of the ring electrode and lamp. Although germicidal lamps are not shown in many of the above described FIGS., it should be understood that a germicidal lamp can be used in all embodiments of the present invention. Where the insulated driver electrode is coated with an ozone reducing catalyst, the ultra-violate radiation from such a lamp may increase the effectiveness of the catalyst. Additional details of the inclusion of a germicidal lamp are included in U.S. Pat. No. 6,444,484, entitled "Electro-Kinetic Device with Enhanced Anti-Microorganism Capability," and U.S. Pat. No. 6,911,186, entitled "Electro-Kinetic Air Transporter and Conditioner Device with Enhanced Housing Configuration and Enhanced Anti-Microorganism Capability," each of which is incorporated herein by reference.

Figure 12B:
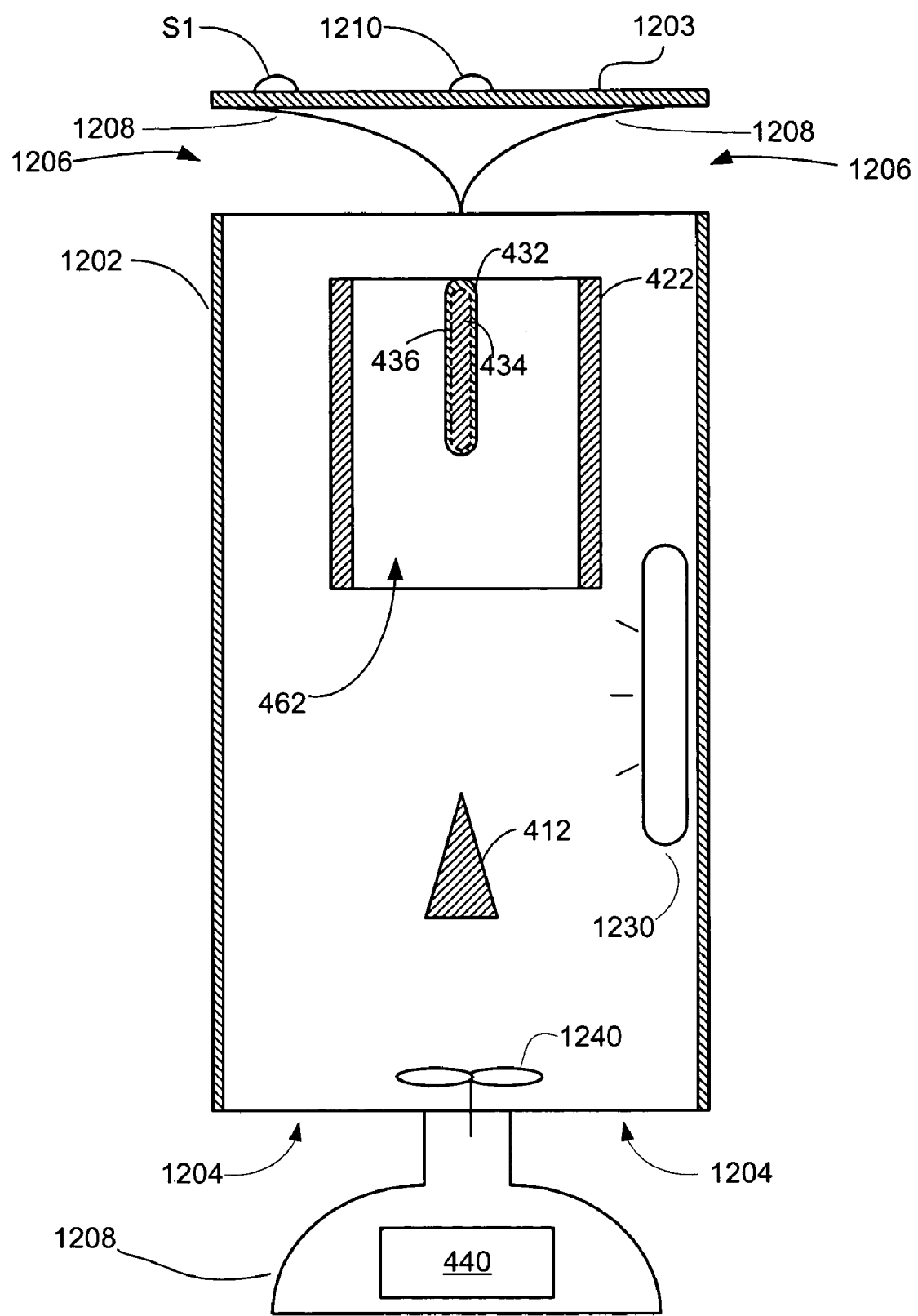

FIG. 12B shows an embodiment where the inlet 1204 is located near the bottom of the housing 1202, and the outlet 1206 is located near the top of the housing. The electrodes 412, 422 and 432 are arranged within the housing so as to produce a vertical airflow from the inlet 1204 to the outlet 1206. Baffles 1208 near the top of the housing 1202 redirects the outgoing airflow in a generally horizontal direction.

Depending on the electrode assembly shape and arrangement, the housing 1402 maybe more elongated in the horizontal direction or in the vertical direction. The airflow from the emitter electrode 412 toward the collector electrode 422 is indeed electro-kinetically produced, in that there are no intentionally moving parts within unit. (Some mechanical vibration may occur within the electrodes). Additionally, because particles are collected on the collector electrodes 422, the air in the room is cleared. It would also be possible, if desired, to further increase airflow by adding a fan 1240, as shown in FIG. 12B. Even with a fan 1240, the driver electrode 432 increases particle collecting efficiency. The fan 1240 can be located upstream from the electrode assembly, as shown in FIG. 12B. If a fan that pulls air is used (as opposed to a fan that pushes air), the fan may be located downstream from the electrode assembly.

The foregoing descriptions of the preferred embodiments of the present invention have been provided for the purposes of illustration and description. It is not intended to be exhaustive or to limit the invention to the precise forms disclosed. Many modifications and variations will be apparent to the practitioner skilled in the art. Modifications and variations may be made to the disclosed embodiments without departing from the subject and spirit of the invention as defined by the following claims. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed:

1. An electro-kinetic air transporter-conditioner system, comprising:
   a pin emitter electrode;
   a ring collector electrode located downstream from said emitter electrode;
   a driver electrode located at least partially within an interior of said ring collector electrode; and
   a high voltage source that provides a voltage potential to at least one of said emitter electrode and said collector electrode to thereby provide a potential difference therebetween.

2. The system of claim 1, wherein:
   said emitter electrode is grounded;
   said collector electrode is negatively charged by said high voltage source; and
   said driver electrode is grounded.

3. The system of claim 1, wherein said emitter electrode and said driver electrode are at a same voltage potential.

4. The system of claim 1, wherein:
   said emitter electrode is at a first voltage potential;
   said collector electrode is a second voltage potential different than said first voltage potential; and
   said driver electrode is at a third voltage potential different than said first and second voltage potentials.

5. The system of claim 1, wherein said ring collector electrode and said driver electrode each includes a corresponding upstream end closest to said emitter electrode, and wherein said upstream end of said driver electrode is further downstream than said upstream end of said ring collector electrode.

6. The system of claim 1, wherein said driver electrode is insulated.

7. The system of claim 6, wherein said driver electrode is insulated with a dielectric material, and said dielectric material is coated with an ozone reducing catalyst.

8. The system of claim 6, wherein said driver electrode is insulated with a dielectric material, wherein said dielectric material comprises a non-electrically conductive ozone reducing catalyst.

9. The system of claim 1, wherein said ring collector electrode is elongated in a direction that is generally coaxial with said pin emitter electrode.

10. The system of claim 9, wherein said ring collector electrode is generally tubular.

11. The system of claim 1, wherein said pin emitter electrode tapers in a downstream direction.

12. The system of claim 1, wherein said pin emitter electrode is generally axially aligned with said driver electrode, and wherein said drive electrode is generally radially centered within the interior of said ring collector electrode.

13. An electro-kinetic air transporter-conditioner system, comprising:
   an emitter electrode;
   a hollow tubular collector electrode located downstream from said emitter electrode;
   a driver electrode located at least partially within an interior of said ring collector electrode and generally radially centered within the interior; and
   a high voltage source that provides a voltage potential to at least one of said emitter electrode and said collector electrode to thereby provide a potential difference therebetween.

14. The system of claim 13, wherein said emitter electrode tapers from a base to an apex, said apex facing said hollow tubular collector electrode and being generally axially aligned with said driver electrode.

15. The system of claim 14, wherein said collector electrode and said driver electrode each includes a corresponding upstream end closest to said emitter electrode, and wherein said upstream end of said driver electrode is further downstream than said upstream end of said collector electrode.

16. The system of claim 13, wherein said emitter electrode and said driver electrode are at a same voltage potential.

17. The system of claim 13, wherein:
   said emitter electrode is at a first voltage potential;
   said collector electrode is a second voltage potential different than said first voltage potential; and
   said driver electrode is at a third voltage potential different than said first and second voltage potentials.

18. The system of claim 13, wherein said driver electrode is insulated.

19. An electro-kinetic air transporter-conditioner system, comprising:
   an emitter electrode that tapers from a base to an apex;
   a ring collector electrode located downstream from said emitter electrode;
   an insulated driver electrode located at least partially within an interior of said ring collector electrode and generally radially centered within said interior, an upstream end of said insulated driver electrode further downstream from said emitter electrode than an upstream end of said ring collector electrode; and a high voltage source that provides a voltage potential to at least one of said emitter electrode and said collector electrode to thereby provide a potential difference therebetween.

20. The system of claim 19, wherein said emitter electrode and said driver electrode are at a same voltage potential.

21. The system of claim 19, wherein:
said emitter electrode is at a first voltage potential;
said collector electrode is a second voltage potential different than said first voltage potential; and
said driver electrode is at a third voltage potential different than said first and second voltage potentials.

22. A method for providing an electro-kinetic air transporter-conditioner system, comprising:
providing a pin emitter electrode;
providing a ring collector electrode downstream from said tapered emitter electrode;
providing a driver electrode at least partially within said ring collector electrode;
proving a first voltage potential difference between said emitter electrode and said collector electrode and a second voltage potential between said driver electrode and said collector electrode.

23. The method of claim 22, further comprising insulating said driver electrode.

24. The method of claim 22, wherein said first voltage potential difference is substantially the equal to said second voltage potential difference.

25. The method of claim 22, wherein said first voltage potential difference is different than said second voltage potential difference.

26. An electro-kinetic air transporter-conditioner system, comprising:
an emitter electrode;
a ring collector electrode located downstream from said emitter electrode, said ring collector electrode including an inner surface which defines an interior of said ring collector electrode;
a driver electrode at least partially surrounded by said inner surface of said ring collector electrode; and
a high voltage source that provides a voltage potential to at least one of said emitter electrode and said ring collector electrode to thereby provide a potential difference therebetween, said potential difference causing a flow of air in a downstream direction from said emitter electrode toward said ring collector electrode and through said interior of said ring collector electrode;
wherein a further potential difference exists between said driver electrode and said ring collector electrode, wherein said further voltage potential difference pushes particles in the flow of air toward said inner surface of said ring collector electrode.

27. The system of claim 26, wherein said drive electrode is insulated.

28. The system of claim 26, wherein said voltage potential difference is substantially equal to said further voltage potential difference.

29. The system of claim 26, wherein said voltage potential difference is different than said further voltage potential difference.

30. The system of claim 26, wherein said emitter electrode includes a base and an apex, said apex pointing downstream toward said interior of said ring collector electrode.

31. An air conditioner system, comprising:
a pin emitter electrode;
a ring collector electrode;
an insulated driver electrode located at least partially within an interior of said ring collector electrode; and
a high voltage source that provides a voltage potential to at least one of said emitter electrode and said collector electrode to thereby provide a potential difference therebetween.

32. The system of claim 31, further comprising a fan upstream from said emitter electrode or downstream from said collector electrode.

33. The system of claim 31, further comprising a germicidal lamp.

34. The system of claim 31, wherein:
said emitter electrode is grounded;
said collector electrode is negatively charged by said high voltage source; and
said driver electrode is grounded.

35. The system of claim 31, wherein said emitter electrode and said driver electrode are at a same voltage potential.

36. The system of claim 31, wherein:
said emitter electrode is at a first voltage potential;
said collector electrode is a second voltage potential different than said first voltage potential; and
said driver electrode is at a third voltage potential different than said first and second voltage potentials.

37. An air conditioner system, comprising:
a freestanding housing including at least one inlet vent and one outlet vent; and
an electrode assembly, located within said housing, comprising:
a pin emitter electrode;
a ring collector electrode;
a driver electrode located at least partially within an interior of said ring collector electrode; and
a high voltage source that provides a voltage potential to at least one of said emitter electrode and said collector electrode to thereby provide a potential difference therebetween.

38. The system of claim 37, wherein said collector electrode is located downstream from said emitter electrode, and wherein said emitter and collector electrodes produce an electro-kinetic flow of air from said inlet vent to said outlet vent.

39. The system of claim 37, further comprising a fan upstream from said emitter electrode or downstream from said collector electrode, wherein said fan produces a flow of air from said inlet vent to said outlet vent.

40. The system of claim 37, further comprising a germicidal lamp within said housing, wherein said germicidal lamp irradiates at least a portion of a flow of air from said inlet vent to said outlet vent.

41. The system of claim 37, wherein said emitter electrode and said driver electrode are at a same voltage potential.

42. The system of claim 37, wherein:
said emitter electrode is at a first voltage potential;
said collector electrode is a second voltage potential different than said first voltage potential; and
said driver electrode is at a third voltage potential different than said first and second voltage potentials.

* * * * *